United States Patent
Toda

(10) Patent No.: US 6,175,662 B1
(45) Date of Patent: Jan. 16, 2001

(54) REGION EXTRACTION METHOD AND APPARATUS

(75) Inventor: Yukari Toda, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/191,533

(22) Filed: Nov. 13, 1998

(30) Foreign Application Priority Data

Nov. 18, 1997 (JP) .................................................. 9-317453

(51) Int. Cl.$^7$ ...................................................... G06K 9/20
(52) U.S. Cl. ........................... 382/282; 382/173; 382/295
(58) Field of Search ................................... 382/282, 239, 382/176, 173, 180, 240, 295, 293

(56) References Cited

U.S. PATENT DOCUMENTS

| | | | |
|---|---|---|---|
| 5,077,811 | 12/1991 | Onda | 382/46 |
| 5,461,459 | 10/1995 | Muramatsu et al. | 355/203 |
| 5,978,519 | * 11/1999 | Bollman et al. | 382/282 |

FOREIGN PATENT DOCUMENTS 0 712 088   5/1996 (EP) .
0 725 359   8/1996 (EP) .

* cited by examiner

*Primary Examiner*—Yon J. Couso
(74) *Attorney, Agent, or Firm*—Fitzpatrick, Cella, Harper & Scinto

(57) ABSTRACT

An edge detection circuit receives multi-valued image data, extracts a portion that satisfies a predetermined condition from the input line, and stores its coordinate data in an edge coordinate memory. A coupling processing circuit generates a rectangular region by coupling the extracted portions, which are separated by only a predetermined distance or less from those stored in the edge coordinate memory, and stores it in a region information memory. The coupling processing circuit discriminates whether or not the generated rectangular region includes a specific image. A binary memory holds bands including the rectangular region which is discriminated to include the specific image. In this way, a specific image region can be extracted from an image signal at high speed without waiting for completion of storage of the entire image signal in a memory and without storing an unnecessary image region in a memory.

25 Claims, 21 Drawing Sheets

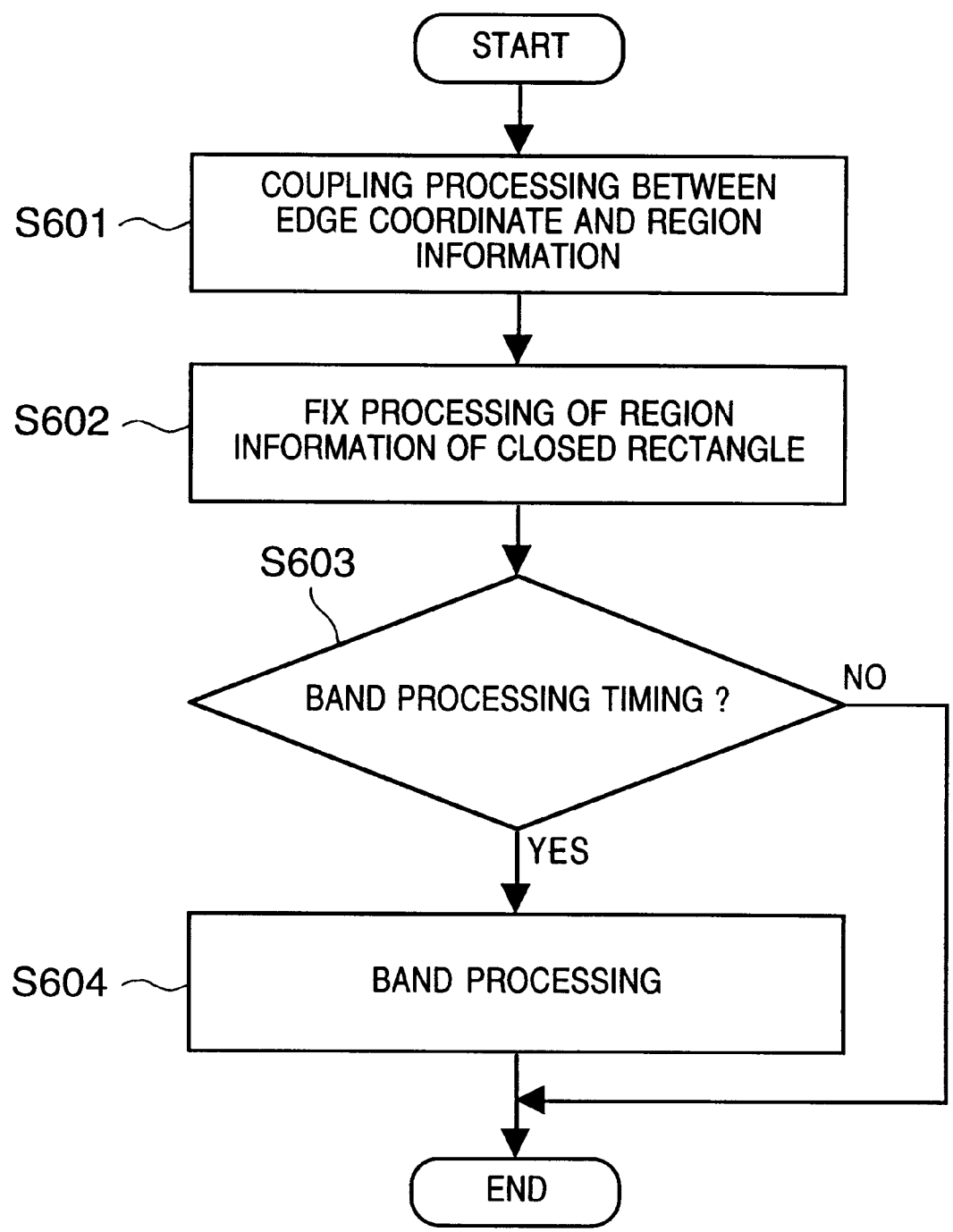

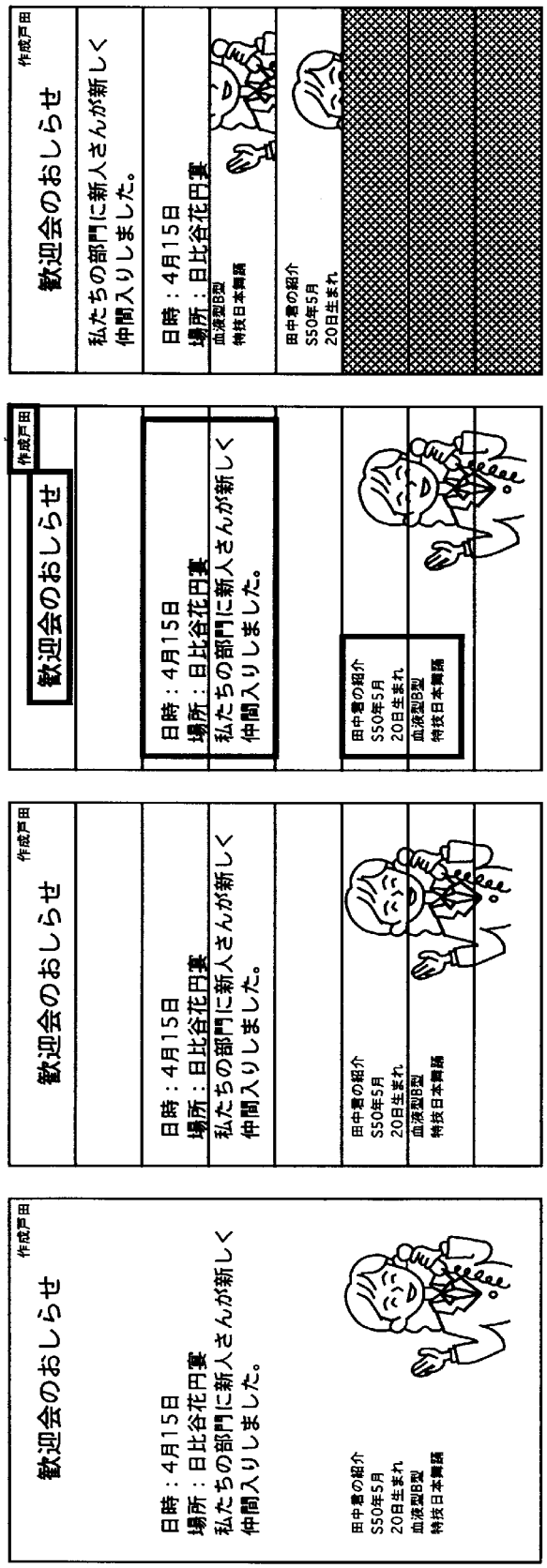

FIG. 12A

| mem_no_for_band[0]=0 | 作成戸田 |
| mem_no_for_band[1]=8 |
| 日時mem_no_for_band[2]=2 場所：日比谷花月園 |
| 私たmem_no_for_band[3]=1く 仲間ハッていた。 |
| mem_no_for_band[4]=8 |
| 田中華へsoomem_no_for_band[5]=4 20日生まれ |
| 血液型R型mem_no_for_band[6]=3 特技 |
| mem_no_for_band[7]=8 |

FIG. 12B

| region_in_band[0]=2 | 作成戸田 |
| 私たregion_in_band[1]=1所しく 仲間ハッていた。 |
| 日時region_in_band[2]=1 場所：日比谷花月園 血液型B型 特技日region_in_band[3]=1月 |
| 田中華へregion_in_band[4]=1 sso年 20日生まれ |
| region_in_band[5]=0 |
| region_in_band[6]=0 |
| region_in_band[7]=0 |

FIG. 13 region INFORMATION

| | |
|---|---|
| Valid | INDICATING WHETHER OR NOT DATA IS VALID |
| fix | INDICATING WHETHER OR NOT DATA IS VALID AND FIXED |
| startx | x START POINT OF RECTANGLE DATA (9 BITS) |
| starty | y START POINT OF RECTANGLE DATA (11 BITS) |
| endx | x END POINT OF RECTANGLE DATA (9 BITS) |
| endy | y END POINT OF RECTANGLE DATA (11 BITS) |
| max_edgenum | EDGE AMOUNT OF REGION DATA IN BAND (9 BITS) |
| pre_del | WHETHER OR NOT CHARACTER DISCRIMINATION RESULT OF IMMEDIATELY PRECEDING BAND INDICATES THAT REGION DATA IS NOT CHARACTER REGION |
| series | WHETHER OR NOT REGION DATA CONTINUES FROM IMMEDIATELY PRECEDING BAND |
| remain | WHETHER OR NOT REGION DATA IS DISCRIMINATED AS CHARACTER REGION IN PREVIOUS BANDS |

(pre_del,series,remain)
(OFF, OFF, OFF)
CHARACTER→remain=ON (OFF, ON, ON)
NOT CHARACTER
→pre_del=ON MOVED-UP endy
(ON, ON, ON)
NOT CHARACTER→
MOVE UP endy
OLD endy

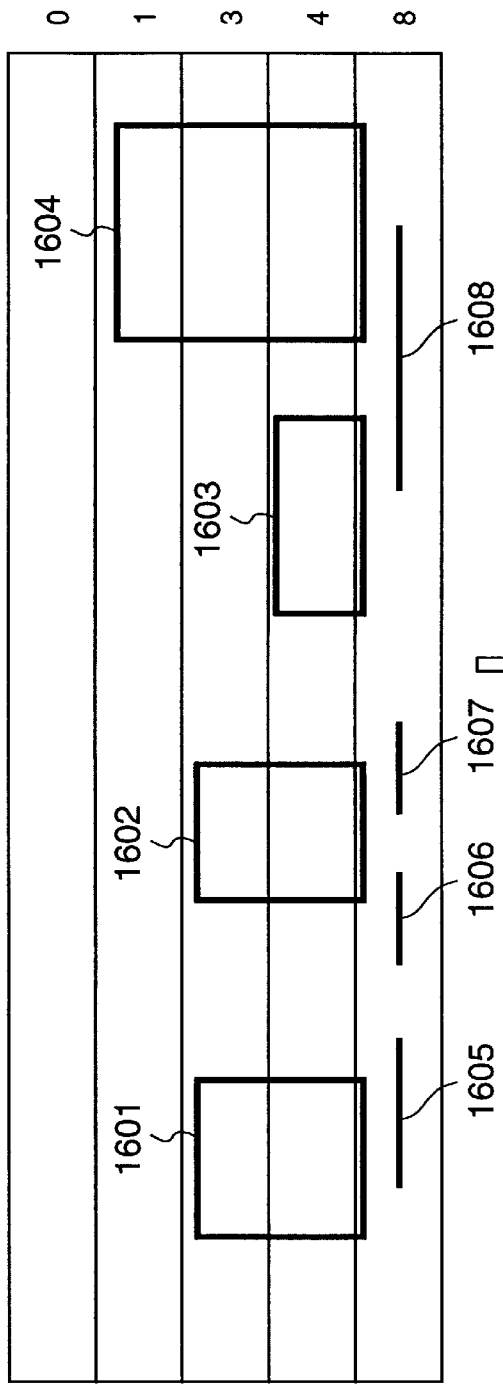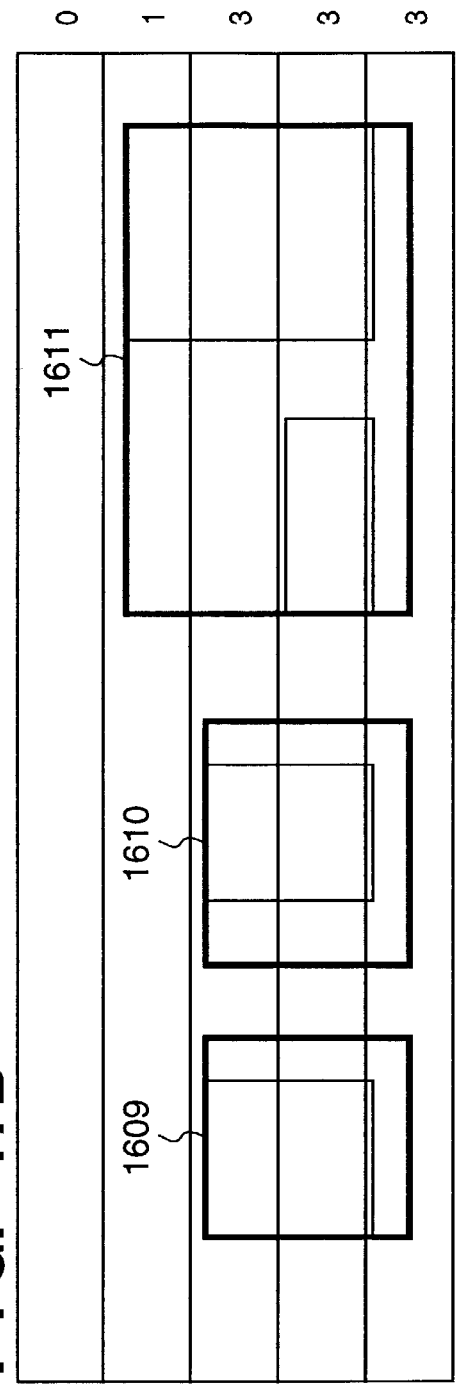

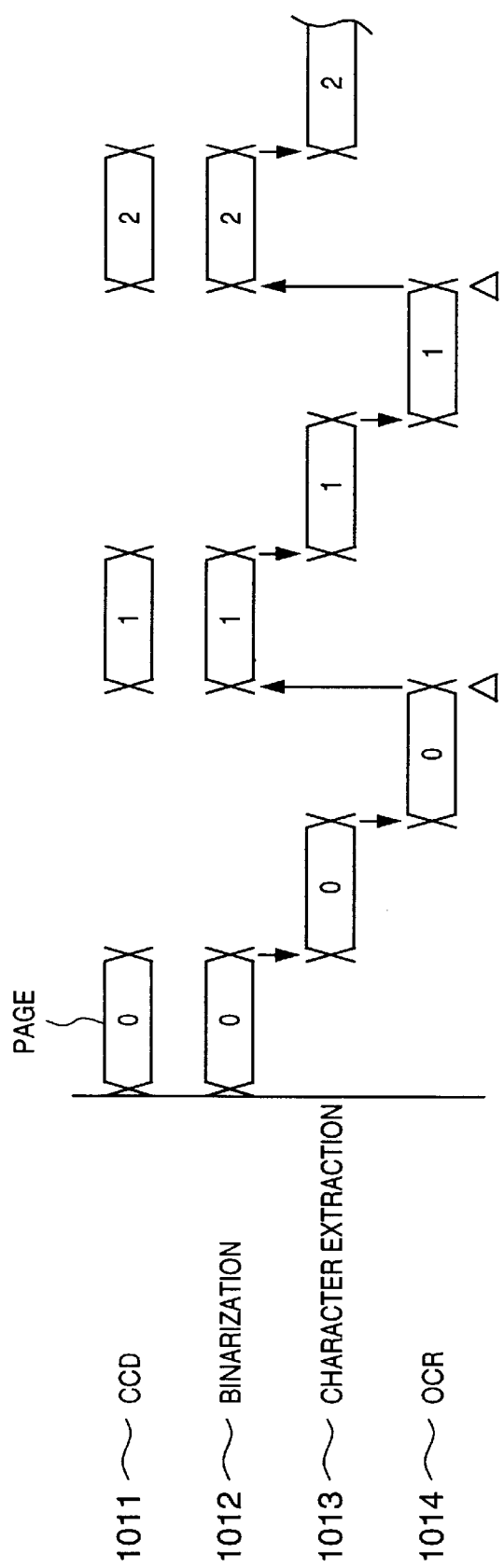

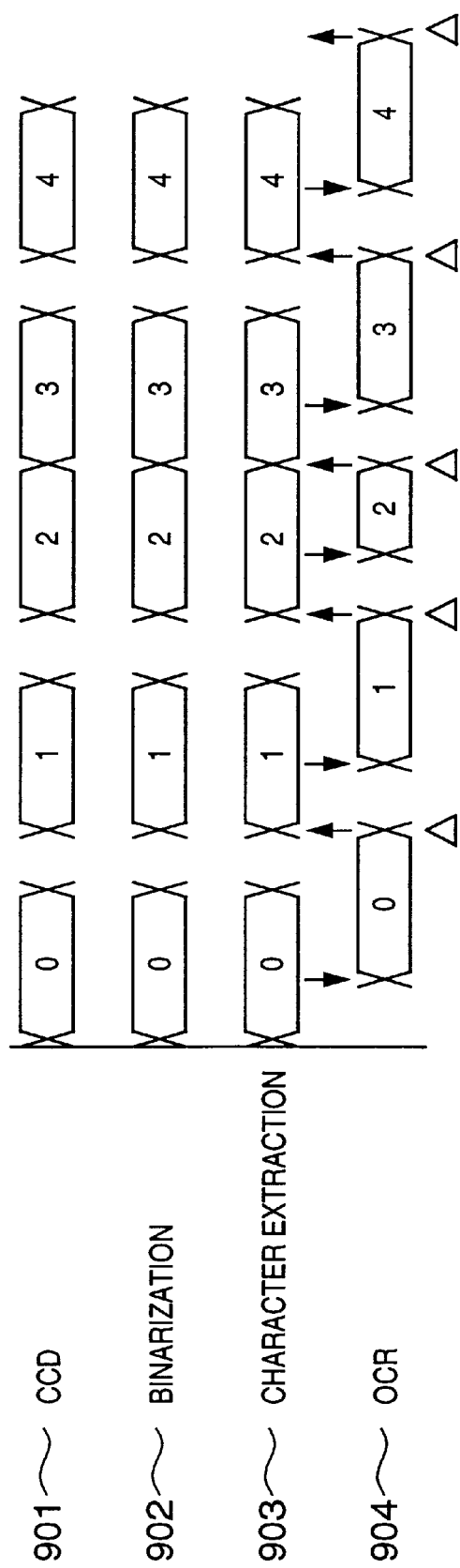

REGION EXTRACTION METHOD AND APPARATUS

BACKGROUND OF THE INVENTION

The present invention relates to a region extraction method for extracting a required region from an image signal, and an information processing apparatus.

Recent copying machines have many intelligent functions, i.e., functions of laying out a plurality of original images on a single sheet, copying images on the two surfaces of a sheet, and the like. Furthermore, owing to perfection of an ADF (Auto Document Feeder), documents can be automatically processed at higher speed. Especially, to copy a plurality of original images on a single recording sheet in a given layout, it is important to automatically discriminate the directions of images. For example, when the user wants to output two each of 20 original images on a single recording sheet in a given layout, i.e., to obtain 10 copies using the ADF, he or she need not adjust all the originals to their natural directions as long as the directions of original images can be automatically discriminated.

In a copying machine that discriminates the direction of an input original in this way, a character region is extracted from the read original image, and is subjected to OCR processing to discriminate its direction. In general, in order to extract a required region from an image signal, the image signal is stored in a memory directly (as a multi-valued signal) or after it is converted into a binary signal, and is subjected to signal processing such as filtering and the like or processing such as edge tracking and the like on the memory, thus extracting a required region, and separating and analyzing regions.

However, the above-mentioned method poses the following problems.

First, a memory for storing the entire image signal is required for region extraction. Although image data is converted into binary data for the purpose of region extraction, a large-capacity memory is required to store the entire image data. In this manner, the large-capacity memory dedicated to only region extraction disturbs cost and size reductions of the apparatus.

Second, region extraction cannot be started before the entire image signal is stored, thus producing a processing time delay.

SUMMARY OF THE INVENTION

The present invention has been made in consideration of the above-mentioned problems, and has as its object to provide a method and apparatus capable of extracting a required region from an image signal at high speed using a small memory capacity without waiting until the entire image signal is stored in a memory and without storing unnecessary image regions in the memory.

In order to achieve the above object, an information processing apparatus according to the present invention comprises:

extraction means for receiving image data in units of lines, and extracting a portion satisfying a predetermined condition from the input line;

generation means for generating a coupled region by coupling portions, which are extracted by the extraction means and separated by not more than a predetermined distance, to each other for a plurality of lines of the image data;

discrimination means for discriminating whether or not the coupled region generated by the generation means includes a specific image; and holding means for holding region information representing the coupled region which is discriminated by the discrimination means to include the specific image, and holding a band including the coupled region which is discriminated to be a region of the specific image in storage means for storing the image data in units of bands.

In order to achieve the above object, a region extraction method according to the present invention comprises:

the extraction step of receiving image data in units of lines, and extracting a portion satisfying a predetermined condition from the input line;

the generation step of generating a coupled region by coupling portions, which are extracted in the extraction step and separated by not more than a predetermined distance, to each other for a plurality of lines of the image data;

the discrimination step of discriminating whether or not the coupled region generated in the generation step includes a specific image; and the holding step of holding region information representing the coupled region which is discriminated in the discrimination step to include the specific image, and holding a band including the coupled region which is discriminated to be a region of the specific image in storage means for storing the image data in units of bands.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flow chart showing an example of the processing sequence of a coupling processing circuit 106;

FIGS. 11A to 11D are views for explaining the principle of band processing;

FIGS. 12A and 12B are views for explaining information pertaining to bands of an image and those in a memory;

FIG. 13 is a view showing an example of region information stored in a region information memory 104;

FIGS. 17A and 17B are views for explaining changes in the number of rectangles in units of bands by the coupling processing;

FIG. 20 is a timing chart for explaining the timings of conventional character direction discrimination; and FIG. 21 is a timing chart when character extraction is used in direction recognition without using double binary memories.

DETAILED DESCRIPTION OF THE PREFERRED EMBODIMENTS

Preferred embodiments of the present invention will now be described in detail in accordance with the accompanying drawings.

Figure 1:
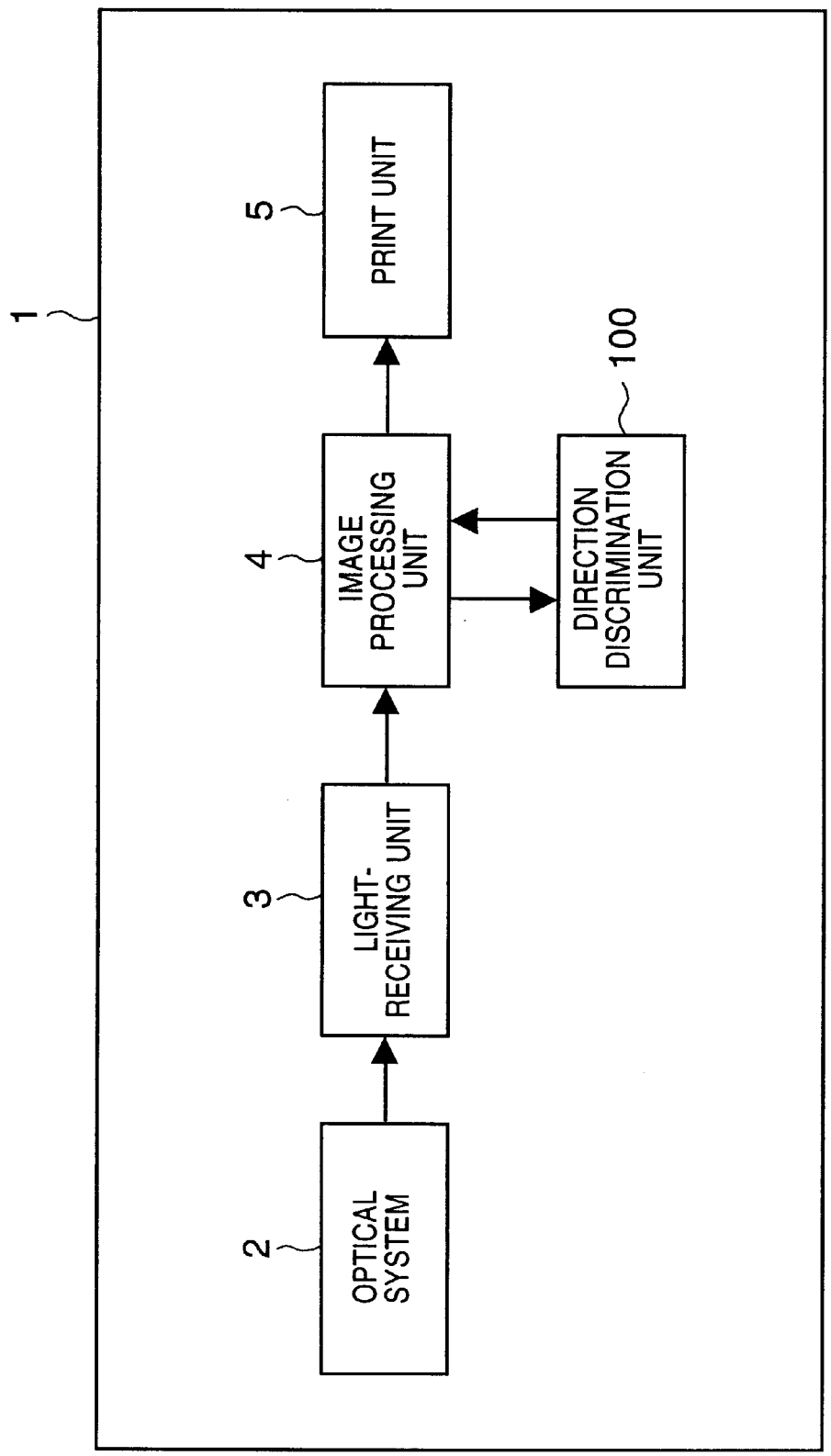
FIG. 1 is a block diagram showing the arrangement of a digital copying machine according to an embodiment of the present invention.

In this embodiment, a copying machine system comprising a function of discriminating the direction of an input original will be described as an embodiment of the present invention. FIG. 1 is a block diagram showing the arrangement of a digital copying machine according to this embodiment. Referring to FIG. 1, reference numeral 1 denotes a digital copying machine. Reference numeral 2 denotes an optical system, which comprises a lamp for illuminating an original sheet, a lens system for guiding light reflected by the original sheet to a CCD sensor of a light-receiving unit 3, and the like. The light-receiving unit 3 reads light reflected by an original sheet and coming from the optical system 2 using the CCD sensor, and converts it into an electrical signal.

Reference numeral 4 denotes an image processing unit which A/D-converts an electrical signal corresponding to an original image output from the light-receiving unit 3 to obtain a digital image signal, and processes the digital image signal in various ways to generate print data. Reference numeral 5 denotes a print unit for forming an image on a recording sheet on the basis of print data output from the image processing unit 4 by, e.g., the laser beam scheme. Note that the image processing unit 4 has a function of laying out a plurality of original images on a single recording sheet.

Reference numeral 100 denotes a direction discrimination unit which discriminates the direction of an original on the basis of the digital signal obtained by A/D conversion in the image processing unit 4, and sends back the discrimination result to the image processing unit 4. Upon laying out a plurality of original images on a single recording sheet, the image processing unit 4 processes images (e.g., rotates images) with reference to the direction discrimination results of the originals so as to adjust the directions of original images.

Figure 2:
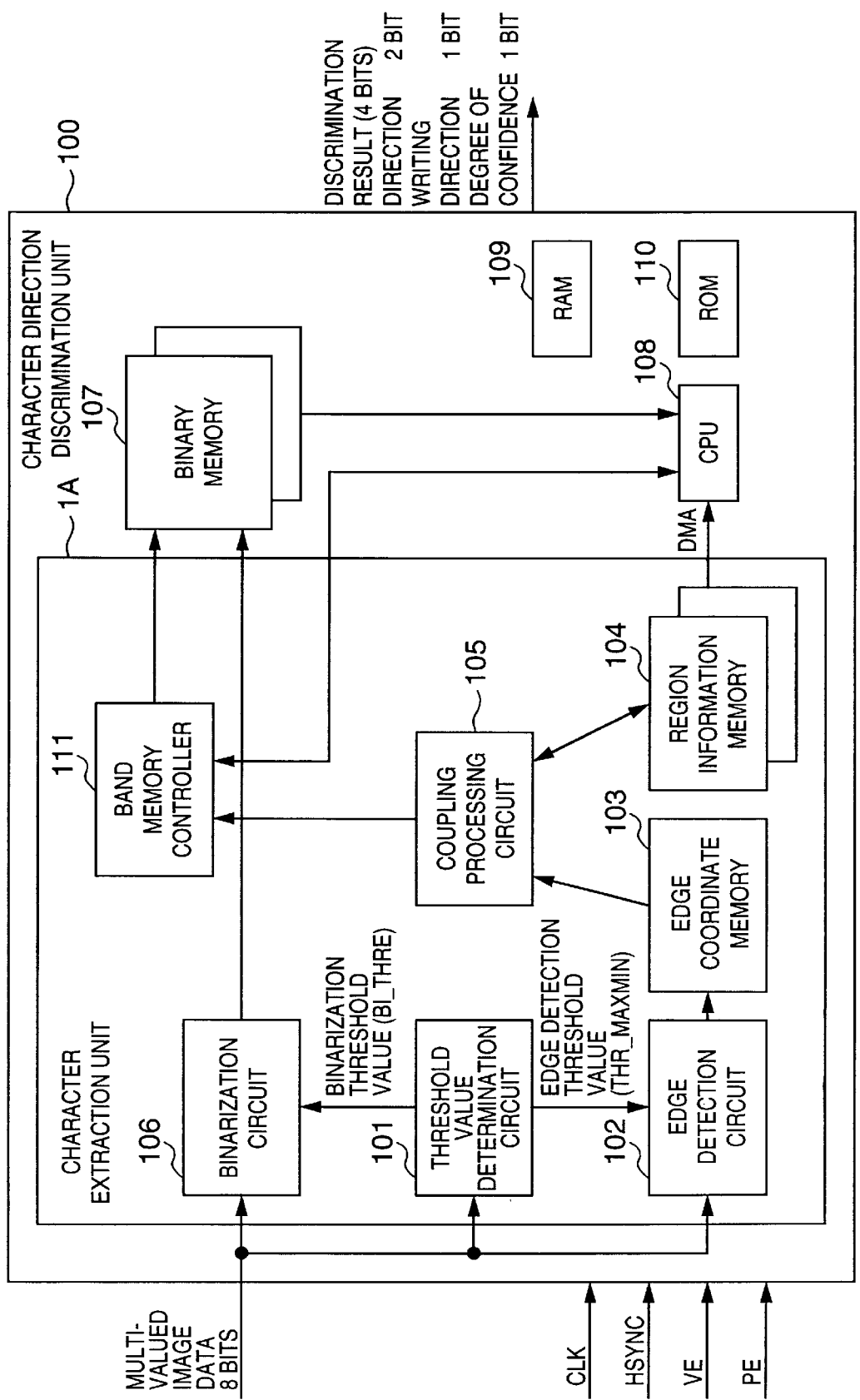
FIG. 2 is a block diagram showing the arrangement of a direction discrimination unit 100 of the embodiment shown in FIG. 1.

The direction discrimination unit 100 implements direction discrimination by extracting a character region, and executing OCR processing for the extracted character region. FIG. 2 is a block diagram showing the arrangement of the direction discrimination unit 100 according to this embodiment. In FIG. 2, the processing blocks bounded by a rectangle 1A execute character extraction, and are the characteristic feature of this embodiment.

Referring to FIG. 2, reference numeral 101 denotes a threshold value determination circuit which receives multi-valued pixel data from an input circuit (the image processing unit 4 in FIG. 1 in this embodiment), and determines a binarization threshold value for binarization, and an edge detection threshold value for edge detection. Reference numeral 102 denotes an edge detection circuit which receives the multi-valued pixel data and the edge detection threshold value as the output from the threshold value determination circuit 101, and performs high-frequency detection in synchronism with clocks. Reference numeral 103 denotes an edge coordinate memory for storing edge coordinate data detected by the edge detection circuit 102.

Reference numeral 104 denotes a region information memory for storing region information generated as a result of coupling the detected edge coordinate data. Reference numeral 105 denotes a coupling processing circuit which compares the coordinate data in the edge coordinate memory 103 and region information memory 104, obtains new region information by coupling a region stored in the region information memory 104 and an edge portion stored in the edge coordinate memory 103 as needed, and stores the result in the region information memory 104. Reference numeral 106 denotes a binarization circuit which receives the multi-valued pixel data and the binarization threshold value as the output from the threshold value determination circuit 101, binarizes the multi-valued pixel data, and outputs binary data.

Reference numeral 111 denotes a band memory controller which generates band information of a binary memory 107 using information output from the edge detection circuit 102, and region coupling information output from the coupling processing circuit 105, and outputs an address of the binary memory 107. The binary memory 107 stores binary data obtained by the binarization circuit 106 in accordance with the address input from the band memory controller 111.

Reference numeral 108 denotes a CPU which performs character recognition using region information (coordinate information) of the region information memory 104 and binary image data stored in the binary memory 107 by executing a control program stored in a ROM 110, and outputs the direction recognition result. Reference numeral 109 denotes a RAM which serves as a word memory upon executing character recognition. The ROM 110 stores codes of a character recognition program and direction discrimination program.

In this embodiment, each of the region information memory 104 and binary memory 107 includes two memories, each of which holds data for one page of an original. The CPU 108 recognizes the position of a character region on the basis of region information stored in the region information memory 104. Then, the CPU 108 reads out binary data of the recognized character region from the binary memory 107 on the basis of the recognition result, and performs character recognition of the binary data in, e.g., 0°, 90°, 180°, and 270° directions to discriminate the direction of the document. In this embodiment, the binary memory 107 stores binary data in units of bands, and stores only bands each containing a character region, as will be described later. The storage state is managed by the band memory controller 111. Hence, the CPU 108 obtains region information from the region information memory 104, and passes it to the memory controller 111. The memory controller 111 generates an address of corresponding binary data from the passed region information, and supplies binary data of the requested region from the binary memory 107 to the CPU 108. In this case, since the binary memory 107 includes two memories, binary data obtained by binarizing an input multi-valued image in real time is written in one memory, and binary data for the previous page is read out from the other memory in response to a request from the CPU. Hence, two signal systems from the band memory controller 111 to the binary memory are prepared or signals must be arbitrated to avoid collisions.

Figure 3:
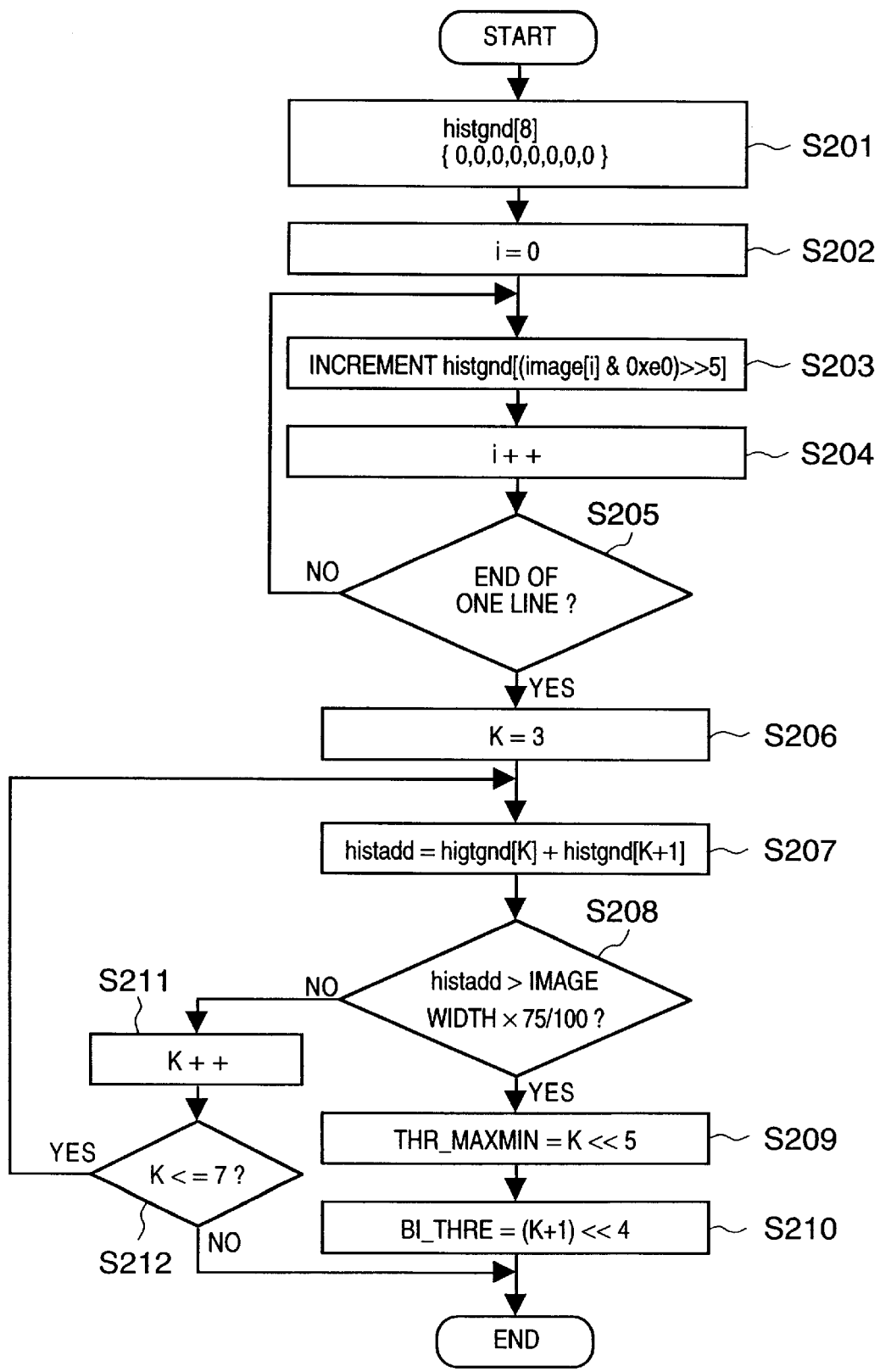
FIG. 3 is a flow chart showing an example of the processing sequence by a threshold value determination circuit 101.

The processing sequence of the threshold value determination circuit 101 will be explained below. FIG. 3 is a flow chart showing an example of the processing sequence by the threshold value determination circuit 101.

The processing by the threshold value determination circuit 101 will be briefly described first. A histogram of luminance value is calculated using a value for upper 3 bits of pixel data for one line (steps S201 to S205). Subsequently, a portion where the total value of a histogram including neighboring levels becomes 75% or more the total number of pixels for one line is detected, and it is determined that the luminance indicated by that histogram is the background of an original (steps S206 to S208, S211, and S212). After the luminance of the background of the original is determined in this way, an edge detection threshold value (THR_MAXMIN) to be passed to the edge detection circuit 102, and a binarization threshold value (BI_THRE) to be passed to the binarization circuit 106 are determined (steps S209 and S210). Assume that "0" of 8-bit pixel data is black luminance data, and "255" is white luminance data. However, the present invention is not limited to this. Also, numerical values such as "upper 3 bits" used upon generating a histogram, "75%" used for discriminating background, and the like are merely examples, and the present invention is not limited to these values.

The flow chart in FIG. 3 will be described in detail below.

In step S201, a histogram buffer histgnd[8] is reset to 0. That is, "0" is written in all eight histogram buffers histgnd[0] to histgnd[7]. In step S202, a pixel counter i is reset to 0. The pixel counter i is used for discriminating whether or not pixels for one line have been processed, upon generating a histogram of pixel data for one line.

In step S203, i-th pixel data image[i] is shifted to the right by five bits (to leave upper 3 bits alone of pixel data), and histgnd[ ] corresponding to that value is incremented. In step S204, the pixel counter i is incremented. It is checked in step S205 if processing for one line has ended. If YES in step S205, the flow advances to step S206; otherwise, the flow returns to step S203. By repeating steps S203 to S205 above, pixel data for one line are distributed to one of levels histgnd[0] to histgnd[7], and the values are stored in histgnd[0] to histgnd[7]. That is, a histogram for upper 3 bits for 1-line data can be obtained.

Subsequently, by the processing in step S206 and the subsequent steps, the binarization threshold value (BI_THRE) and edge detection threshold value (THR_MAXMIN) are determined.

In step S206, K indicating a histogram level number is reset to 3. Histogram values having neighboring K-th and (K+1)-th levels are added to each other in step S207, and it is checked in step S208 if the sum exceeds 75% the number of pixels for one line.

The reason why the value K is reset to not 0 but 3 lies in the following fact. That is, even when background level (0 to 2) near black level of the histogram is detected, characters are unlikely to be present on such background. Also, even when characters are present, they are likely to be outlined characters. Hence, levels 0 to 2 are excluded from the discrimination range. Note that outlined character processing (e.g., reversal upon binarization) may be done.

In step S207, the neighboring histogram levels are added to each other. For example, if K=3, the sum is histgnd[3]+histgnd[4], and this represents the number of pixels present within the 8-bit pixel value range from 96 (binary value 01100000) to 159 (binary value 10011111). This sum is substituted in histadd.

On the other hand, it is checked in step S208 if the histadd obtained in step S207 exceeds 75% the total number of pixels in one line. If YES in step S208, it is determined that the level of interest indicates background, and the flow advances to step S209 to determine the threshold value. On the other hand, if NO in step S208, the flow advances to step S211 to increment K by 1 and to check for the next level.

In step S209, the value obtained by shifting K to the left by five bits is substituted in THR_MAXMIN as the edge detection threshold value. As a result, the lower limit value of the pixel value range that histgnd[K] covers is set in the edge detection threshold value. Subsequently, in step S210, the value obtained by shifting (K+1) to the left by four bits is substituted in the binarization threshold value BI_THRE, thus ending the processing. As a result, a value ½ the lower limit value of the pixel value range that histgnd[K+1] covers is set in the binarization threshold value.

On the other hand, K is incremented in step S211. If it is determined in step S212 that K≦7, the flow returns to step S207 to repeat the above-mentioned processing. On the other hand, if K>7, this processing ends. As a result, the previous edge detection threshold value and binarization threshold value are held.

By providing such threshold value determination circuit 101 to vary THR_MAXMIN, even characters printed on color paper can be satisfactorily extracted.

Figure 4:
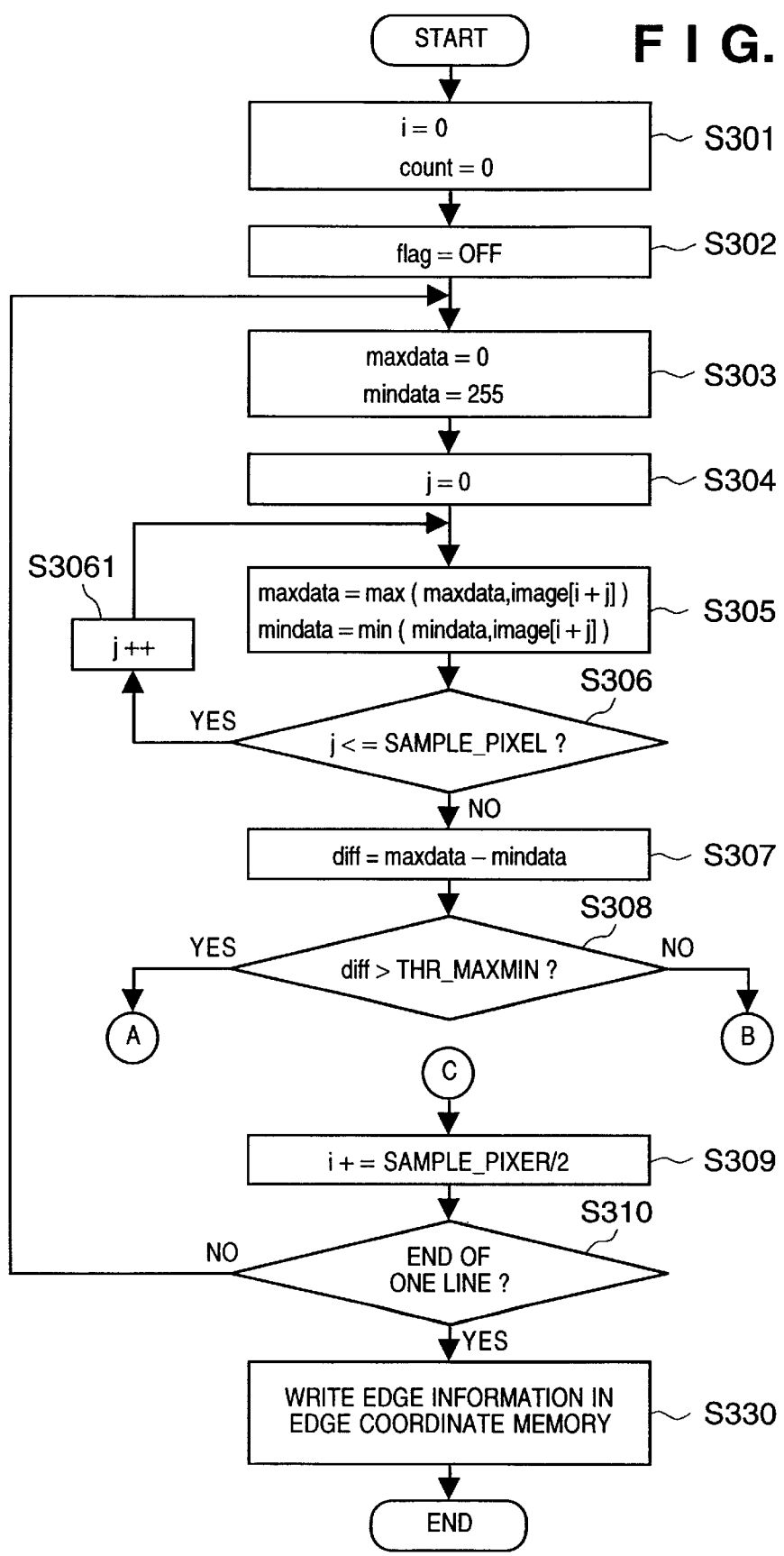
FIG. 4 is a flow chart for explaining the processing sequence by an edge detection circuit 102.
Figure 5:
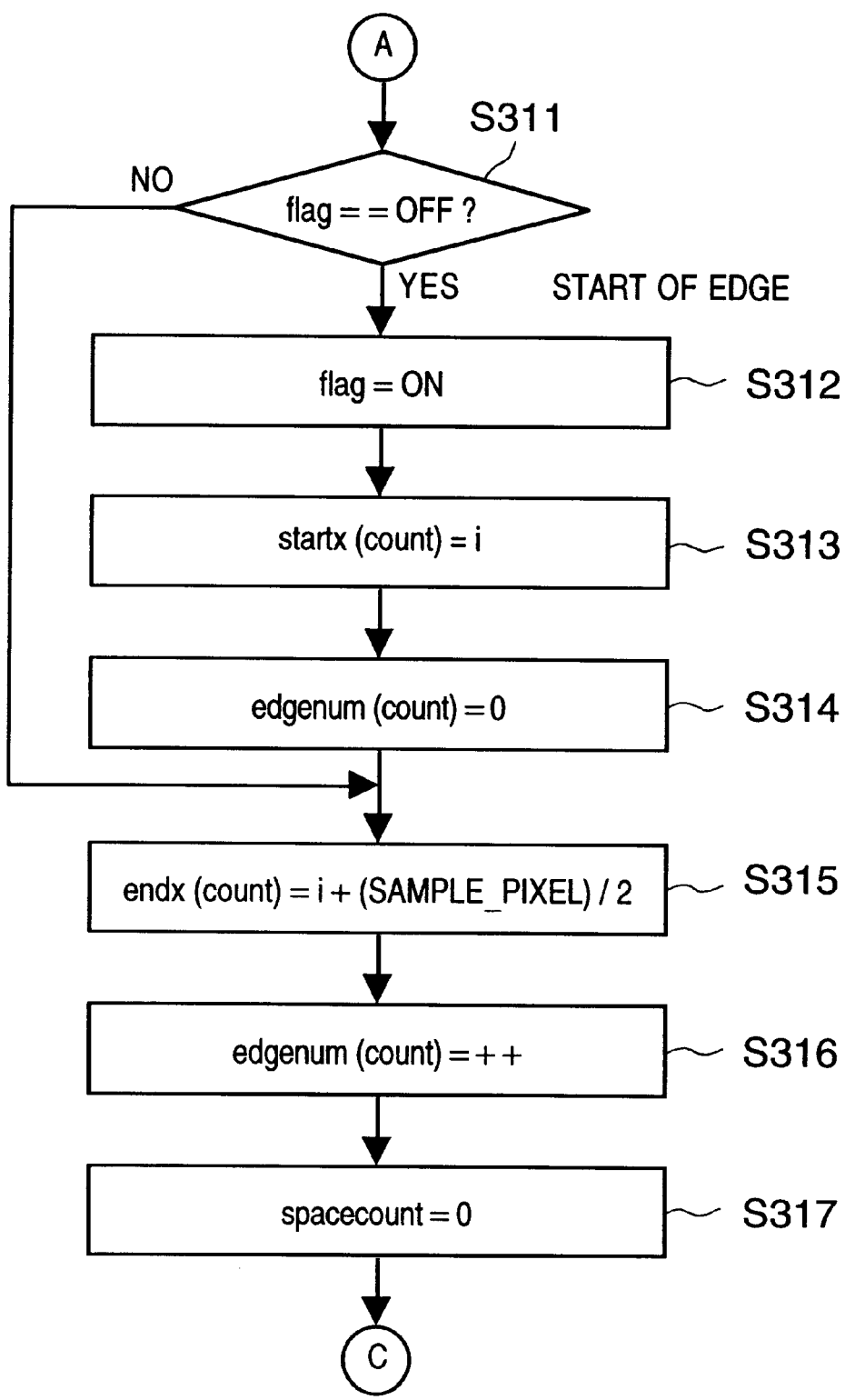
FIG. 5 is a flow chart for explaining the processing sequence by the edge detection circuit 102.
Figure 6:
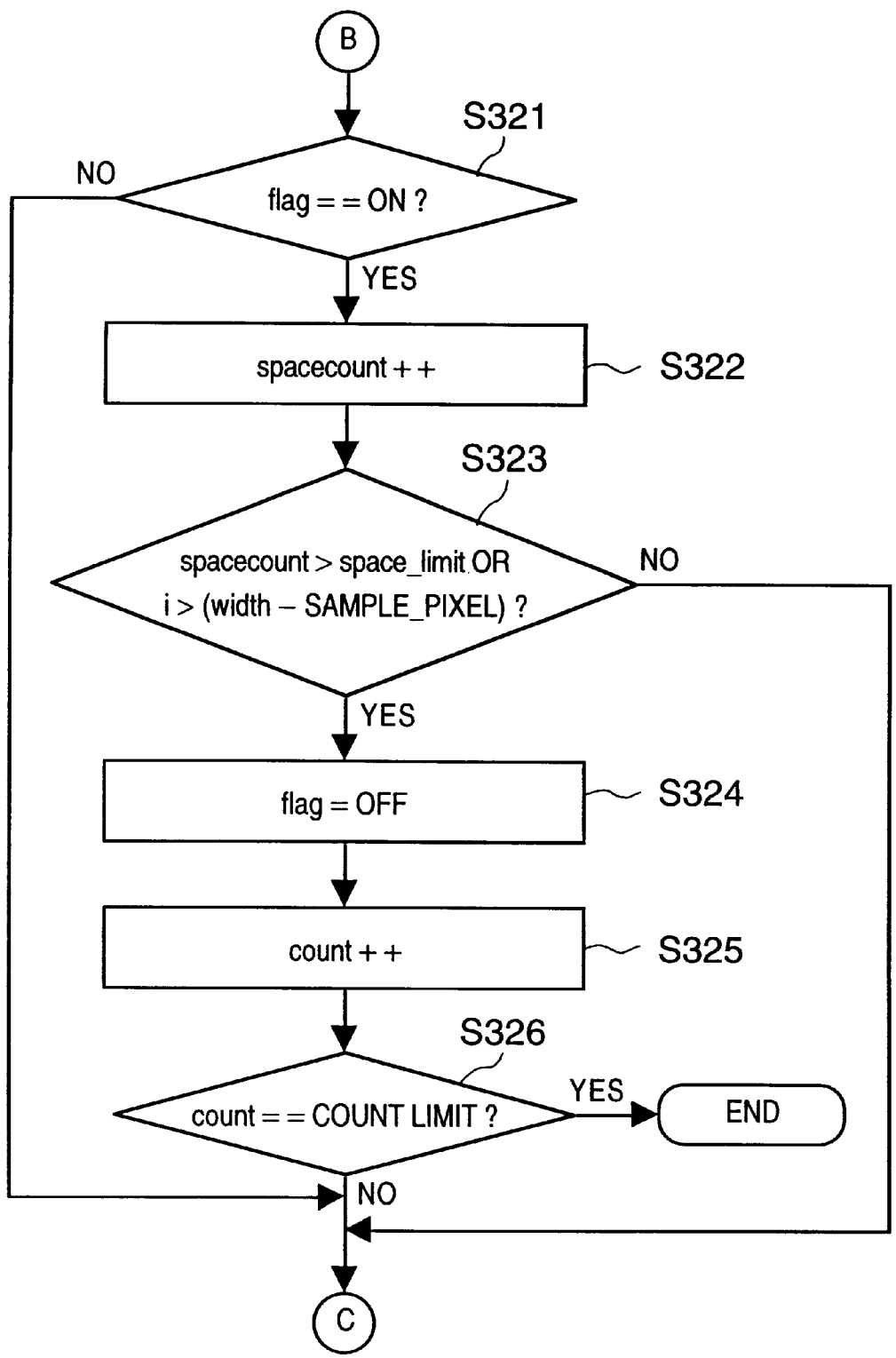
FIG. 6 is a flow chart for explaining the processing sequence by the edge detection circuit 102.

The processing sequence of the edge detection circuit 102 will be de scribed below. FIGS. 4 to 6 are flow charts for explaining the processing sequence of the edge detection circuit. Note that the processing of the threshold value determination circuit 101 described above with reference to FIG. 3, and the processing of the edge detection circuit 102 shown in FIGS. 4 to 6 are simultaneously executed, and the edge detection threshold value THR_MAXMIN in FIG. 3 is constantly changing. In this case, the determined threshold value is applied to the processing for the next line.

The operation of the edge detection circuit 102 will be briefly described below. In edge detection, continuous SAMPLE_PIXEL pixels are extracted from one line, and it is checked based on the difference between the maximum and minimum values of the extracted pixels if the extracted portion corresponds to an edge portion (steps S301 to S308). Based on this discrimination result, detection of the start and end positions of an edge, coupling of neighboring edges, counting of the number of edges, and the like are done (steps S311 to S317, and S321 to S326). The aforementioned processing is executed for one line while overlapping the pixel extraction range by SAMPLE_PIXEL/2 pixels, and the obtained edge information is written in the edge coordinate memory (steps S309, S310, and S330). For example, if SAMPLE_PIXEL=8, edge detection is executed for the 0th to 7th pixels, for the 4th to 11th pixels, then for the 8th to 15th pixels, and so forth, while overlapping the pixel extraction range. Edge detection will be described in detail below with reference to FIGS. 4 to 6.

In step S301, i that counts the number of pixels per line, and count that counts the number of extracted edges are reset to zero. In step S302, a flag "flag" indicating if edge extraction is in progress is reset to OFF.

In step S303, "0" is set in maxdata, and "255" is set in mindata. In steps S304 to S306, SAMPLE_PIXEL pixels starting from the i-th pixel are checked, the maximum value of these pixels is stored in maxdata, and the minimum value is stored in mindata. In step S307, the difference between the maximum and minimum values maxdata and mindata is substituted in diff.

It is checked in step S308 if diff is larger than THR_MAXMIN determined by the threshold value determination circuit 101. If diff>THR_MAXMIN, the flow advances to node A (step S311 in FIG. 5); otherwise, the flow advances to node B (step S321 in FIG. 6). After the processing in node A or B, the flow returns to node C, and i is incremented by SAMPLE_PIXEL/2 in step S309. It is checked in step S310 if processing for one line has ended. If YES in step S310, edge information is written in the edge coordinate memory 103 in step S330, thus ending this processing. On the other hand, if NO in step S310, the flow returns to step S303 to repeat the above-mentioned processing.

If it is determined in step S308 that diff>THR_MAXMIN, the flow advances to step S311 in FIG. 5.

It is checked in step S311 if the flag "flag" indicating whether or not edge extraction is in progress is OFF. If flag is OFF, the start of an edge is determined, and the flow advances to step S312 to execute edge start processing (steps S312 to S314). On the other hand, if flag is ON, since edge extraction is in progress, the flow jumps to step S315 without executing edge start processing.

In the edge start processing, the flag "flag" indicating whether or not edge extraction is in progress is set ON in step S312. In step S313, i is substituted in startx[count] indicating the start coordinate of the edge of interest ((count)-th edge). As a consequence, the start coordinate of the (count)-th edge is set at the head pixel of THE SAMPLE_PIXEL pixels of interest. Next, edgenum[count] indicating the number of edges of the edge of interest ((count)-th edge) is reset to zero in step S314.

In step S315, i+SAMPLE_PIXEL/2 is substituted in endx[count] indicating the end coordinate of the (count)-th edge. In step S316, edgenum[count] indicating the number of edges of the (count)-th edge is incremented. In step S317, space_count for counting the number of spaces in the horizontal direction is reset to zero. This space_count is used for determining an identical edge (i.e., to couple neighboring edge portions in the horizontal direction) if the number of spaces is equal to or smaller than a threshold value, even when a small region without any edge is present in the horizontal direction, in the processing in steps S321 to S326 to be described later. This processing reduces the load on coupling processing to be described later.

On the other hand, if it is determined in step S308 in FIG. 4 that diff≦THR_MAXMIN, the flow advances to step S321 in FIG. 6.

It is checked in step S321 if the flag "flag" indicating whether or not edge extraction is in progress is ON. If YES in step S321, since the edge may have ended, the flow advances to step S322. On the other hand, if flag is OFF, the flow directly jumps to node C (step S309). In step S322, space_count is incremented. It is checked in step S323 if space_count is equal to or larger than predetermined space_limit, or if i is larger than (horizontal width "width" of image—SAMPLE_PIXEL). If one of these conditions is met, the flow advances to step S324. However, if neither of these conditions are met, the flow directly jumps to node C (step S309). The former condition in step S323 determines the end of the edge of interest if the number of small regions without any edge exceeds the limit value (space_limit). This condition implements coupling of edge portions. The latter condition indicates a case wherein processing for the raster image width (width) is finished, and the edge of interest must be ended.

If the end of the edge is determined in step S323, the flag "flag" indicating whether or not edge extraction is in progress is set OFF in step S324. In step S325, count indicating the number of edges is incremented. It is checked in step S326 if count has reached COUNT_LIMIT. If YES in step S326, the flow advances to node "END" to prevent the memory area of the edge coordinate memory 103 from overflowing. If NO in step S326, the flow advances to node C (step S309).

Figure 7:
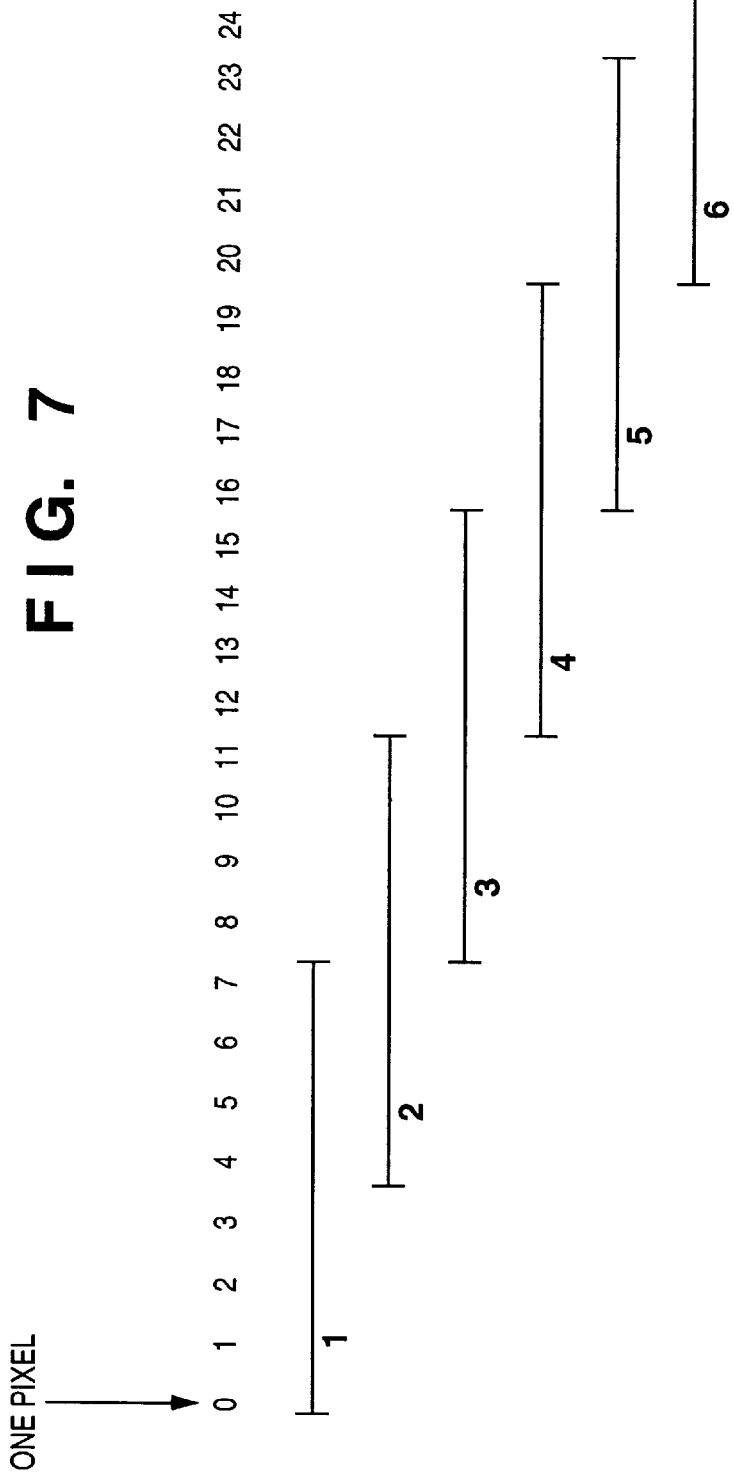
FIG. 7 is a view for explaining an overlap example in edge detection.

FIG. 7 is a view for explaining an example of the overlapping ranges in edge detection. In the aforementioned maximum value/minimum value extraction processing shown in FIG. 7, if SAMPLE_PIXEL=8, the 0th to 7th pixels are checked to obtain their maximum and minimum values, and steps S307 to S310 are then executed. Subsequently, the 4th to 11th pixels are checked to obtain their maximum and minimum values, and steps S307 to S310 are then executed. Then, the 8th to 15th pixels are checked to obtain their maximum and minimum values, and steps S307 to S310 are then executed. In this way, processing is executed while extracting pixels from overlapping ranges.

When character extraction to be described below is done by the aforementioned overlapping extraction for the result obtained by reading an image at 300 dpi while SAMPLE_PIXEL=16, characters ranging from 7 to 32 points can be extracted without exception. However, the value SAMPLE_PIXEL and the number of pixels included in the overlapping range are not limited to the above-mentioned ones. That is, the value SAMPLE_PIXEL can be appropriately selected, and the number of pixels included in the overlapping range is not limited to SAMPLE_PIXEL/2 or pixels need not always be repetitively extracted.

Figure 8:
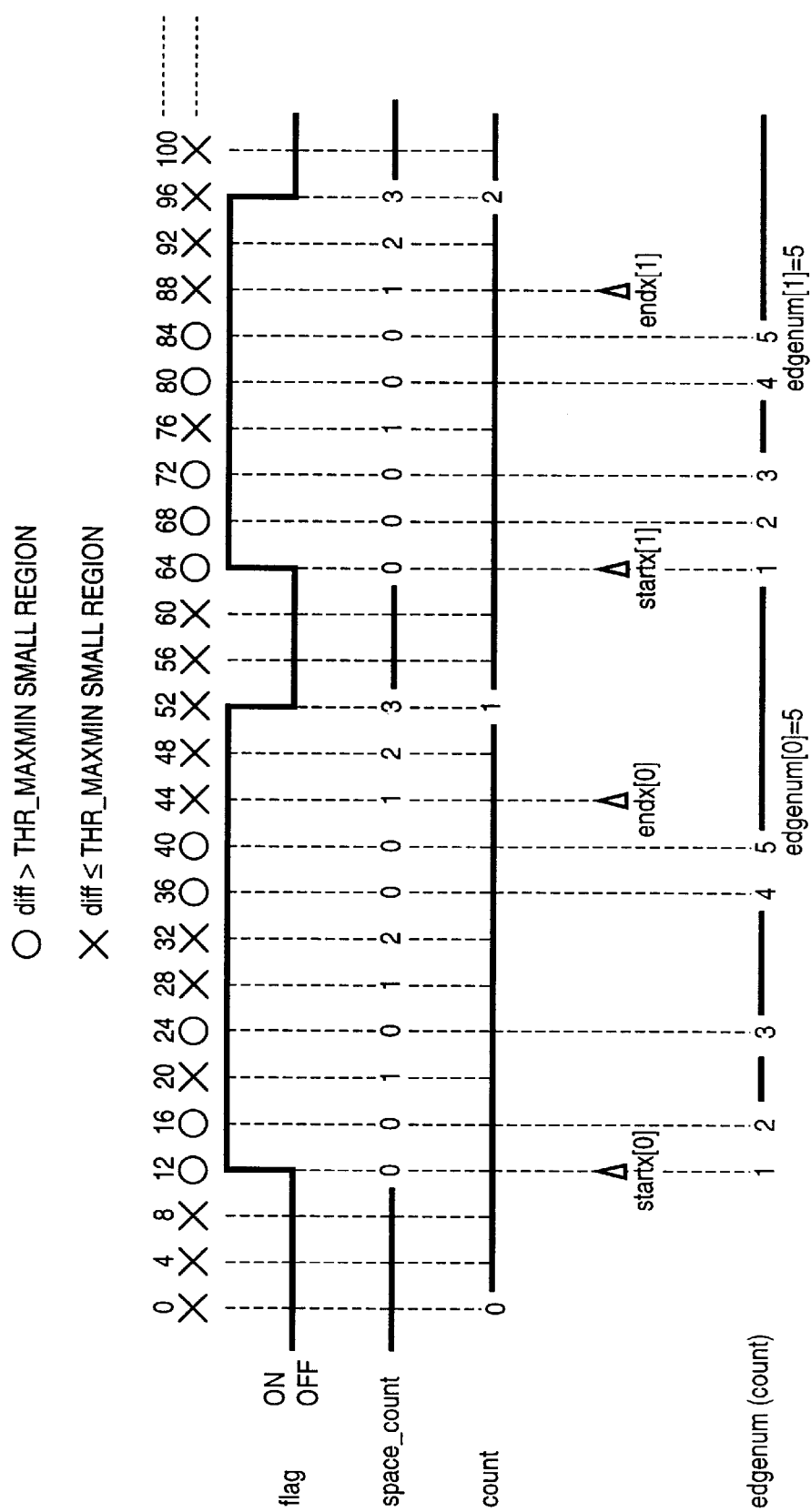
FIG. 8 shows an example of an edge coordinate detection result when SAMPLE_PIXEL=8 and space_limit=2.

FIG. 8 shows an example of the edge coordinate detection result when SAMPLE_PIXEL=8 and space_limit=2. In FIG. 8, ○ indicates a case wherein diff>THR_MAXMIN in a small region including the processed SAMPLE_PIXEL pixels, and X indicates a case wherein diff≦THR_MAXMIN.

In small regions of i=0, 4, and 8, diff≦THR_MAXMIN. Since the flow branches to the NO side in step S308 and also in step S321, no edge information is generated.

In a small region of i=12, since diff>THR_MAXMIN, the flow branches to the YES side in step S308. At this time, since flag=OFF and count=0, the flow branches to the YES side in step S311 to set flag ON and to substitute i=12 in startx[0] (steps S312 to S313). Although edgenum[0] is reset to zero in step S314, it is incremented to 1 in step S316 after that. In step S315, i+SAMPLE_PIXEL=16 is substituted in endx[0].

In a small region of i=16 as well, since diff>THR_MAXMIN, the flow advances from step S308 to step S311. Since flag is already ON in step S311, the flow advances to step S315. In step S315, i+SAMPLE_PIXEL=20 is substituted in endx[0]. Also, in step S316, edgenum[0] is incremented to 2.

In a small region of i=20, since diff≦THR_MAXMIN, the flow advances from step S308 to step S321. Since flag is ON in step S321, the flow advances to step S322 to increment space_count to 1. In step S323, since neither conditions are met, the flow advances to step S309 (in this example, space_limit=2).

In a small region of i=24, since diff>THR_MAXMIN again, the flow advances from step S308 to step S311. Since flag is ON in step S311, the flow branches to NO to substitute 28 in endx[0], to increment edgenum[0] to 3, and to reset space_count to zero.

When the processing for small regions has progressed in this way up to a small region of i=52, since diff≦THR_MAXMIN, the flow advances from step S308 to step S321. Since flag is ON in step S321, the flow advances to step S322 to increment space_count to 3. As a result, since space_count>space_limit in step S323, the flow advances to step S324 to set flag OFF. Then, count is incremented to 1. NO is determined in step S326, and the flow advances to step S309.

In this fashion, edge extraction in the horizontal direction is executed while coupling neighboring edges spaced by a given distance or less.

Merits of coupling edges which are separated from each other in practice will be explained below. When edge extraction is done while coupling neighboring edges which are separated from each other at the time of edge detection, the upper limit of the memory areas of the edge coordinate memory 103 and region information memory 104 can be lowered. As a result, a merit of reduced memory areas and a merit of shorter coupling processing time after that can be obtained.

For example, when data as large as an A3 original size (around 30 cm in the main scanning direction×around 42 cm in the sub-scanning direction) is to be recorded at 300 dpi, if SAMPLE_PIXEL=8 and the overlapping processing shown in FIG. 7 is not done, the maximum value of edge information generated is 3,543/16=221 (space_limit=0). Also, when edge detection in the sub-scanning direction is done every eighth line, 4,960/16=310.

When the above processing is implemented by hardware, the capacities of the edge coordinate memory 103 and region information memory 104 must be determined initially. At this time, if the memories have maximum required capacities, the edge coordinate memory must have 221 data, and the region information memory 104 must have 221× 310=68,510 data. The coupling processing in such case has 221×68,510=15,140,710 combinations. Since such processing is impossible to attain in terms of both time and capacity, the number of data in each of the edge coordinate memory 103 and region information memory 104 is preferably reduced to around 128. However, in such case, overflow of data (edge information or region information) takes place. To prevent such overflow, when space_limit is set at 3, the maximum value required for the edge coordinate memory 103 is 3,543/32=110, and can be small. Also, overflow that takes place when the depth of the region information memory 104 is set at 128 can be suppressed.

The coupling processing circuit 105 will be explained below. FIG. 9 is a flow chart showing an example of the processing sequence of the coupling processing circuit 106. The coupling processing circuit 106 executes coupling processing, fix processing, band processing, and the like on the basis of new edge information stored in the edge coordinate memory 103 and region information stored in the region information memory 104 to update the region information in turn.

Region information stored in the region information memory 104 will be explained below. FIG. 13 shows an example of region information stored in the region information memory 104. Valid is 1-bit information indicating whether or not the region information is valid. Fix is 1-bit information indicating whether or not the region information is fixed. Startx is the x-axis start point of rectangle data. This data can be expressed by 9 bits (3,543+8=442) if the maximum original size is A3 and the number of samples in edge detection is 8. Starty is the y-axis start point of rectangle data. This data can be expressed by 11 bits (4,960+4=1,270) if the maximum original size is A3 and the processing spacing of edge detection is 4. Endx is the x-axis end point of rectangle data. This data can be expressed by 9 bits if the maximum original size is A3 and the number of samples in edge detection is 8. endy is the y-axis end point of rectangle data. This data can be expressed by 11 bits if the maximum original size is A3 and the processing spacing of edge detection is 4. Max_edgenum is the edge amount of rectangle data in a band. For example, if max_edgenum holds the maximum number of edges determined by a MAXMIN threshold value, this data can be expressed by 9 bits since it does not exceed the maximum value of X.

pre_del is 1-bit information indicating whether or not that rectangle data is determined not to be a character in character discrimination of the immediately preceding band. Series is 1-bit information indicating whether or not that rectangle data continues from the immediately preceding band. Remain is 1-bit information indicating whether or not that rectangle data is determined to be a character in character discrimination of previous bands. These pre_del, series, and remain are generated by the band processing. The aforementioned region information is generated by the coupling processing circuit 105.

In step S601, coupling processing of edge coordinate data (edge start point startx[ ], edge end point endx[ ]) detected by the edge detection circuit 102 and stored in the edge coordinate memory 103, and region information stored in the region information memory 104 is performed.

Figure 10A:
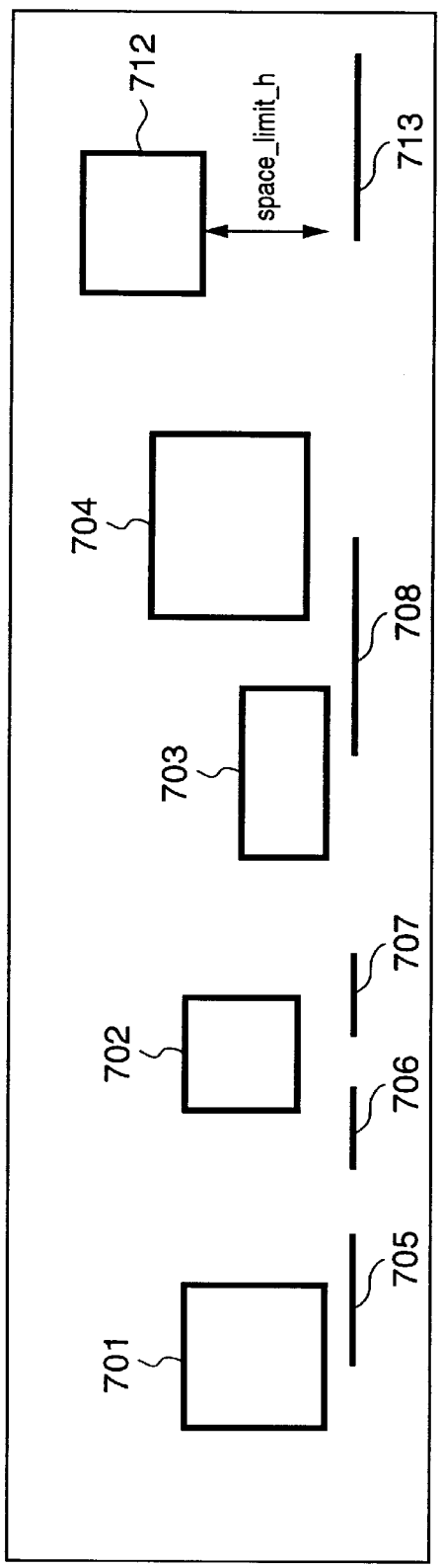
FIGS. 10A and 10B are views for explaining coupling processing.
Figure 10B:
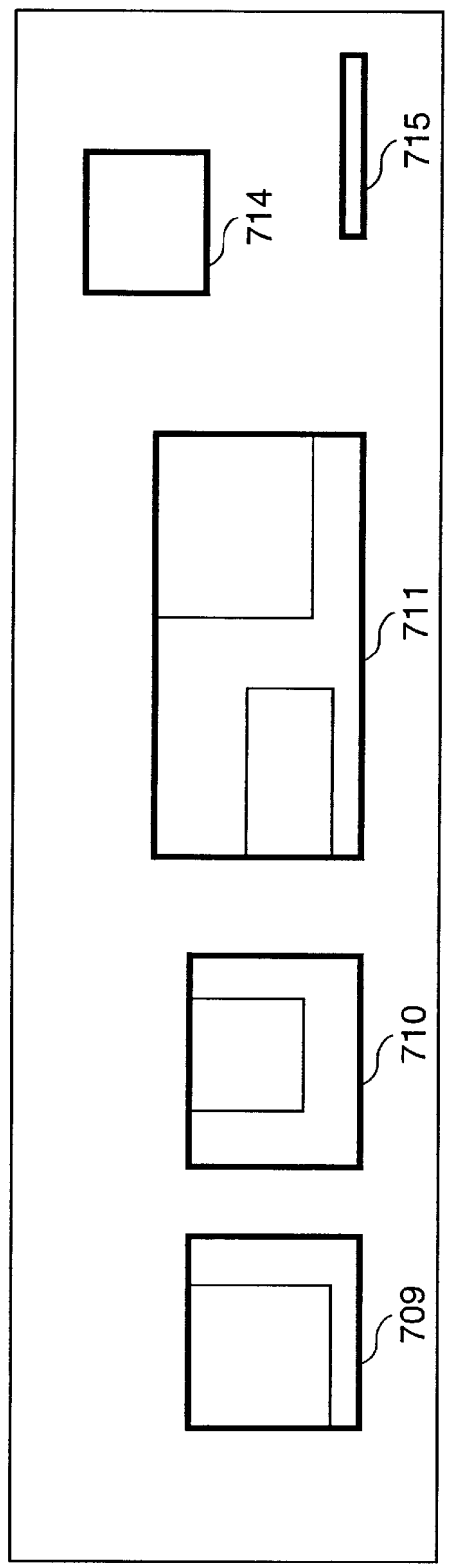

FIGS. 10A and 10B are views for explaining the coupling processing. Reference numerals 701 to 704 and 712 in FIG. 10A denote examples of regions indicated by region information stored in the region information memory 104. On the other hand, reference numerals 705 to 708 and 713 are examples of edge portions indicated by edge information detected by the edge detection circuit 102 and stored in the edge coordinate memory 103.

Note that information stored in the region information memory 104 includes the rectangle start coordinate data (startx, starty), the rectangle end coordinate data (endx, endy), the maximum number of edges (max_edgenum), and the flag (fix) indicating whether or not that rectangle is fixed. However, the format of the region information is not limited to the above-mentioned example, and each region need not have a rectangular shape. Also, the edge information stored in the edge coordinate memory 104 includes the start point (startx), end point (endx), and the number of edges (edge_num).

The coupling processing circuit 105 determines based on the positional relationship between the region 701 stored in the region information memory 104 and the edge region 705 stored in the edge coordinate memory 103 that they are to be coupled, generates region information of a region 709 as a result, and overwrites the region information of the region 701 in the region information memory 104 with the region information of the region 709. In this case, the maximum number of edges is a larger one of max_edgenum of the region 701, and edge_num of the edge region 705. In this manner, the rectangle start coordinate data (startx, starty), rectangle end coordinate data (endx, endy), and the maximum number of edges (max_edgenum) associated with the region 701 are updated to obtain region information indicating the rectangle 709 in FIG. 10B. Whether or not a region stored in the region information memory 104 is coupled to an edge region stored in the edge information memory is determined by checking if the x-coordinates of these two regions overlap each other, and the minimum spacing between the y-coordinates of the two regions is equal to or smaller than space_limit_h. If these conditions are met, coupling is done.

Similarly, the circuit 105 determines that the edge regions 706 and 707 are to be coupled to the region 702, generates region information of a region 710 as a result, and overwrites the region information of the region 702 in the region information memory with the generated region information. In this case, the maximum number of edges is a larger one of max_edgenum of the region 702 and the sum of values edge_num of the edge regions 706 and 707.

Since the edge region 708 is coupled to both the regions 703 and 704, region information of a region 711 is generated as a result. The generated region information is overwritten on the that of the region 703 in the region information memory 104, and that of the region 704 is deleted. In this case, the maximum number of edges is a larger one of the sum of values max_edgenum of the regions 703 and 704, and edge_num of the edge region 708.

Referring back to FIG. 9, upon completion of region coupling as mentioned above, region information of a closed rectangle is extracted and is fixed in step S602. Fix processing will be explained below with the aid of FIGS. 10A and 10B. Since the region 712 stored in the region information memory 104 has no edge region to be coupled within the range space_limit_h below it, it is determined that the rectangle of this region information is closed, and fix processing is done. In the fix processing, it is checked if the region of interest is a character region.

If max_edgenum of the region is larger than r_width= (endx—endy), that is, if max_edgenum/r_width>THR_EDGE_RATE (predetermined value), if r_width>THR_WIDTH (predetermined value) and if r_height=(starty—endy)>THR_HEIGHT (predetermined value), it is determined that the region of interest is a character region. Then, the flag fix is ON. On the other hand, if these conditions are not satisfied, it is determined that the region of interest is not a character region, and the region information is deleted. Note that the above conditions are merely an example, and various other conditions may be used. For example, the ratio of the area to the number of edges may be checked, or the value THR_EDGE_RATE may be varied depending on r_width.

Note that space_limit determines whether or not neighboring edges which are slightly separated from each other in the horizontal direction are coupled, while space_limit_h is used for determining whether or not neighboring edges which are slightly separated from each other in the vertical direction are coupled. With this coupling, the memory area of the region information memory 104 can be reduced. Also, a character can be extracted in units of blocks in place of lines.

Referring back to FIG. 9, it is checked in step S603 if band processing is to be executed. For example, the band processing is done in response to a multiple of 64 pixels (64 lines) in the ordinate direction as a trigger. In this case, the flow advances to step S604 every 64th line to execute band processing. If the band processing timing is not reached, the processing of the line of interest ends.

The band processing will be explained below. FIGS. 11A to 11D are views for explaining the principle of the band processing. FIG. 11A shows an original to be processed. FIG. 11B shows an image divided into bands by the band processing. As described above, when the band processing is done at about 64-pixel intervals (5 mm at 300 dpi), a satisfactory processing result can be obtained. However, in FIGS. 11A to 11D, an image is divided into eight bands for the sake of simplicity. FIG. 11C shows character regions of the image shown in FIG. 11A. Portions bounded by bold rectangles are extracted character regions. FIG. 11D shows the image held in the real memory space of the binary memory. A band including no characters is temporarily written in the memory but is overwritten by a new band if it is determined that no characters are present in the band. As a result, the image shown in FIG. 11A is stored in the memory while omitting bands including no characters.

In the example shown in FIGS. 11A to 1D, eight bands can be stored in a real image space, and can also be stored in the memory space. In order to reduce the memory capacity, the number of bands to be stored in the memory space is set to be smaller than that in the real image space. For example, the number of bands in the real image space is 64, and that in the memory space is 16.

FIGS. 12A and 12B are views for explaining information pertaining to the bands of an image and those in the memory. FIG. 12A shows information which indicates the correspondence between the band numbers of an image and those of the memory. That information is named mem_no_for_band[]. If FIG. 11D above shows the storage result in the memory, final mem_no_for_band[8] is {0, 8, 2, 1, 8, 4, 3, 8}. Since numerical value "8" is not present in a memory space (0 to 7) having eight memory bands with zero origin, it indicates that the band is not present on the binary memory. For example, the second band from the top in FIG. 12A is mem_no_for_band[1]=8, and it is not stored in the binary memory.

On the other hand, FIG. 12B shows information indicating the number of character regions in each band of the memory. This information is named region_in_band[]. If FIG. 11D shows the storage result in the memory, final region_in_band[8] is {2, 1, 1, 1, 1, 0, 0, 0}. For example, the uppermost band includes two character regions.

The aforementioned information mem_no_for_band[] and information region_in_band[] are generated by the band memory controller 11, and are used to generate the address of the binary memory. This processing will be explained in detail later.

Figure 14:
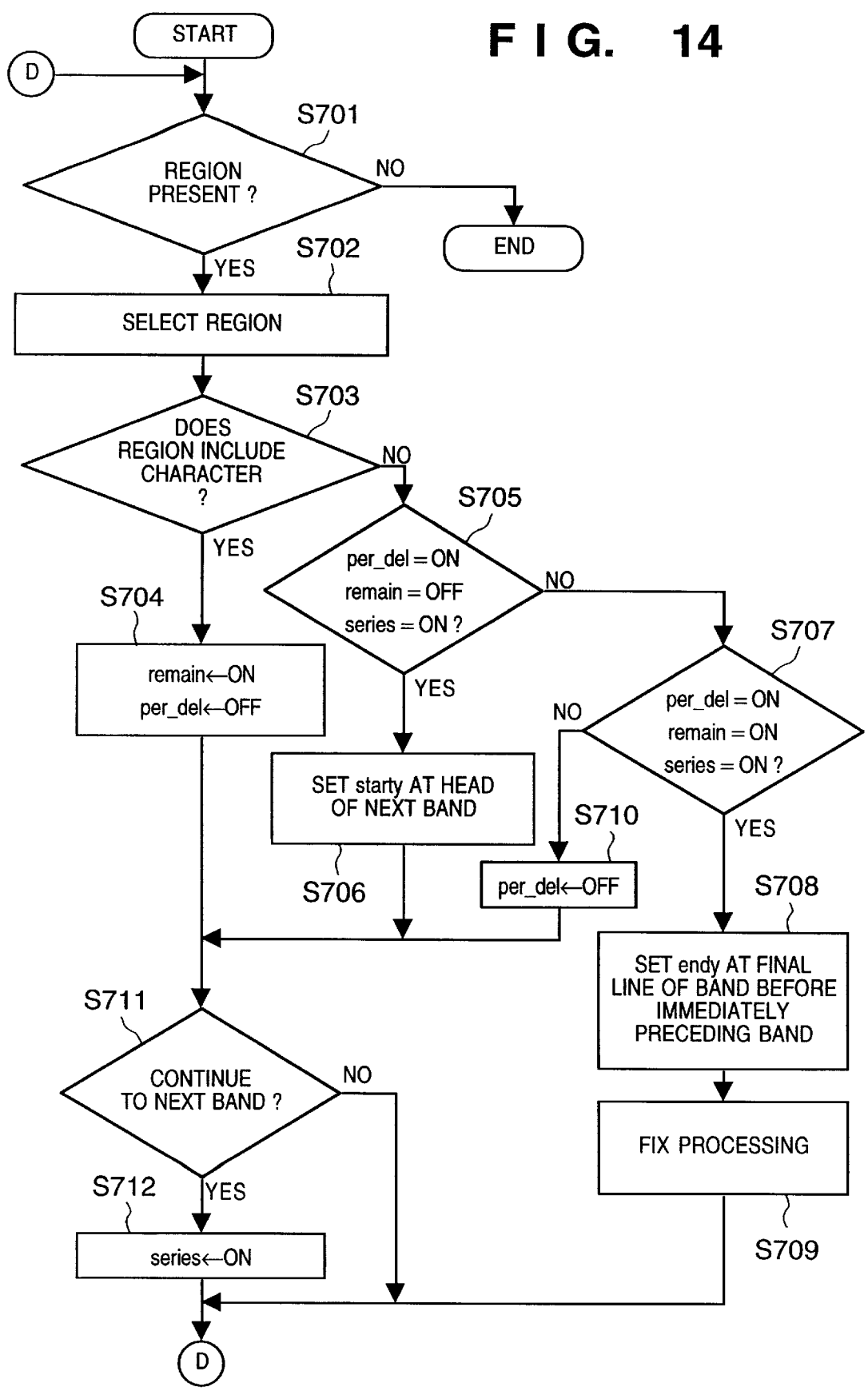
FIG. 14 is a flow chart for explaining the sequence of the band processing.

FIG. 14 is a flow chart for explaining the sequence of the band processing. It is checked in step S701 if the band of interest includes rectangular regions obtained by the coupling processing or the like. If YES in step S701, the flow advances to step S702 to select one region.

It is checked in step S703 if the selected region includes characters in the band of interest. This checking may be attained by various methods. For example, the same conditions as those in step S602 may be used. If it is determined in step S703 that the region includes characters, the flow advances to step S704; otherwise, the flow advances to step S705.

In step S704, remain of the region information is set ON, and pre_del OFF. On the other hand, it is checked in step S705 if a condition "pre_del=ON & remain=OFF & series=

ON" is satisfied. If this condition is satisfied, the rectangular region of interest extends over two bands, and neither bands include characters. Hence, it is determined that these two band portions of the rectangular region of interest are unnecessary, and starty of the region information is updated to indicate the head of the next band in step S706. With this processing, of the rectangular region, portions including no characters can be omitted in units of bands. After that, the flow advances to step S711.

If the condition in step S705 is not satisfied, the flow advances to step S707 to check if a condition "pre_del=ON & remain=ON & series=ON" is satisfied. If this condition is satisfied, it is once determined that the rectangular region of interest includes characters but the latest two bands do not include any characters. Hence, endy is updated to indicate the end line of the band before the immediately preceding band, and the latest two band portions (including no characters) of the rectangle of interest are cut. Furthermore, the rectangle of interest is fixed in step S709. With this processing, unnecessary portions including no characters can be cut. Upon completion of the processing in step S709, since the rectangle of interest is fixed, the flow returns to step 5701 to process the next region.

If the condition in step S707 is not satisfied, either, the flow advances to step S710 to set pre_del ON, and the flow then advances to step S711.

It is checked in step S711 if the rectangular region of interest continues to the next band. If YES in step S711, series in the region information of the rectangular region of interest is set ON in step S712. The flow then returns to step S701 to process the next rectangular region. If no rectangular regions to be processed remain in step S701, this processing ends.

The aforementioned band processing will be explained below using two original examples shown in FIGS. 15A to 15D and FIGS. 16A to 16D. FIGS. 15A to 15D and FIGS. 16A to 16D are views for explaining examples of the band processing.

Figure 15B:
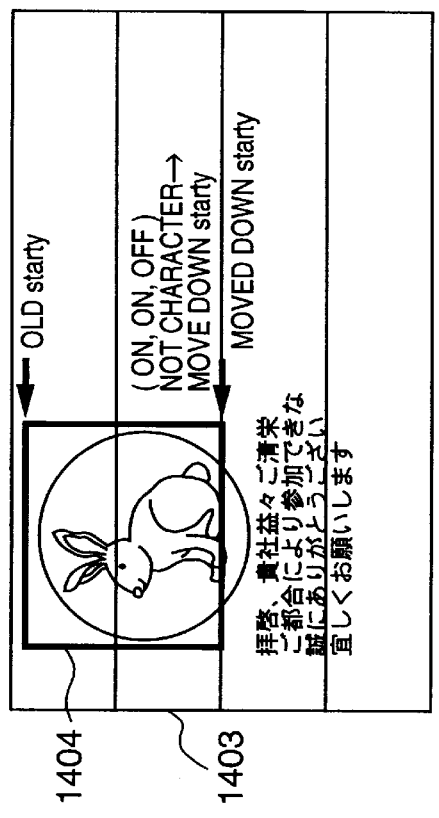
FIGS. 15A to 15D are views for explaining an example of the band processing.
Figure 15D:
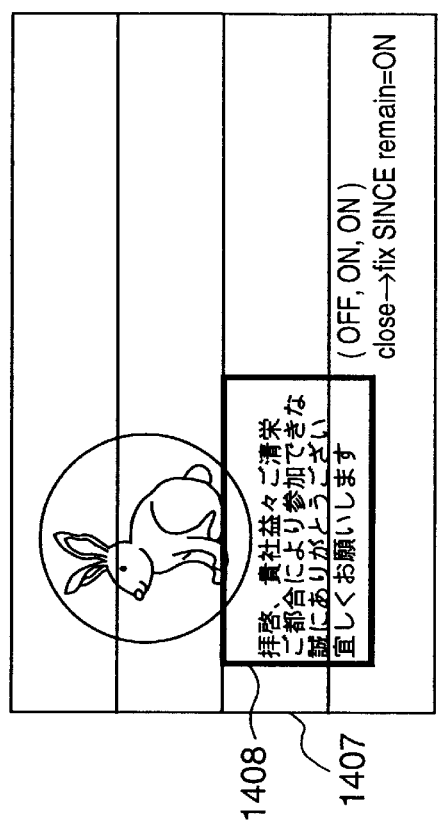
Figure 15A:
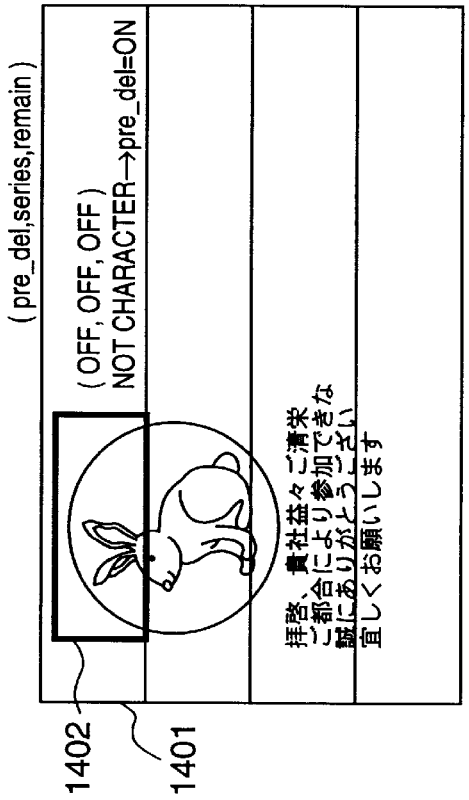

Processing of an original on which an illustration is followed by characters, as shown in FIGS. 15A to 15D, will be described first. In this image, a rectangle including the illustration and all the characters is extracted unless the band processing is done. FIG. 15A shows the processing of an uppermost band 1401. In the process of the band processing for the band 1401, a rectangle 1402 has been extracted by edge detection and coupling processing. Of this rectangle information, (pre_del, series, remain) is (OFF, OFF, OFF) since this rectangle starts within that band. On the other hand, max_edgenum indicating the edge amount in that rectangle information is very small since this rectangle includes the illustration, and does not exceed the threshold value for character discrimination. Hence, the character discrimination result of the rectangle 1402 in the band 1401 is "not character", and since the rectangular region of interest continues to the next band, rectangle information (pre_del, series, remain) is (ON, ON, OFF).

FIG. 15B shows the processing of a second band 1403. In the process of the band processing of the band 1403, a rectangle 1404 has been extracted. Its rectangle information (pre_del, series, remain) is (ON, ON, OFF) in accordance with the band processing result of the band 1401. In this band, max_edgenum indicating the edge amount in that rectangle information is very small owing to the presence of the illustration, and does not exceed the threshold value for character discrimination. Hence, the character discrimination result of the rectangle 1404 in the band 1403 is "not character".

In such state, i.e., when the character discrimination result indicates "not character" and pre_del, series, and remain are respectively, ON, ON, and OFF, processing for moving down starty (step S706) is executed. Starty saved in the rectangle information indicates a point present in the band 1401. However, when "the character discrimination result is "not character", pre_del=ON, series=ON, and remain=OFF" in the process of the band processing of the band 1403, starty is moved down to the head of the next band. Then, rectangle information (pre_del, series, remain) is set as (ON, ON, OFF).

Figure 15C:
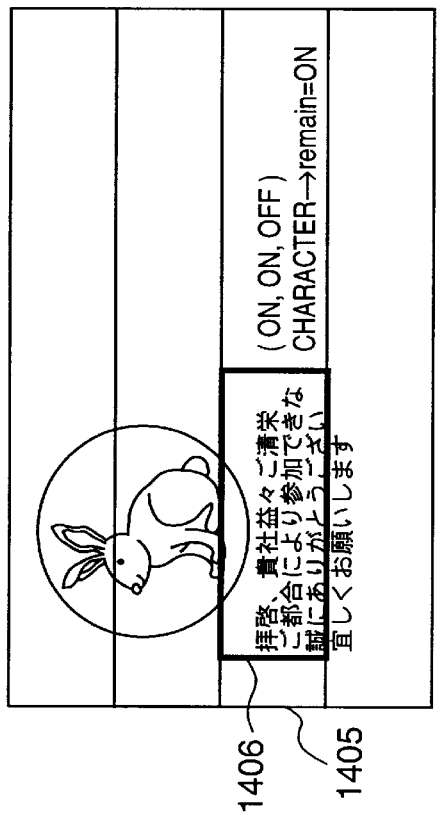

FIG. 15C shows the processing of a third band 1405. In the process of the band processing of the band 1405, a rectangle 1406 has been extracted. Its rectangle information (pre_del, series, remain) is (ON, ON, OFF) in accordance with the band processing result of the band 1403. In this band, max_edgenum indicating the edge amount in that rectangle information is very large owing to the presence of characters and exceeds the threshold value for character discrimination. Hence, the character discrimination result of the rectangle 1406 in the band 1405 is "character", and the rectangle information (pre_del, series, remain) is updated to (OFF, ON, ON).

FIG. 15D shows the state wherein a rectangle is closed within a fourth band 1407. As a result of the above band processing, a rectangle 1408 is extracted, and is closed (does not continue any more). When the rectangle is closed, its rectangle information (pre_del, series, remain) is (OFF, ON, ON) in accordance with the band processing result of the band 1405. In this band, max_edgenum indicating the edge amount in that rectangle information is very large owing to the presence of characters and exceeds the threshold value for character discrimination. Hence, the character discrimination result of the closed rectangle 1408 in the band 1407 is "character". As a result, that rectangle is held as a character rectangle. In this connection, even when the character discrimination result in the band 1407 indicates "not character", since remain=ON, that rectangle is held as a character rectangle.

The processing of an original on which characters are followed by an illustration, as shown in FIGS. 16A to 16D, will be explained. In this image, a rectangle including all the characters and illustration is extracted unless band processing is done.

Figure 16A:
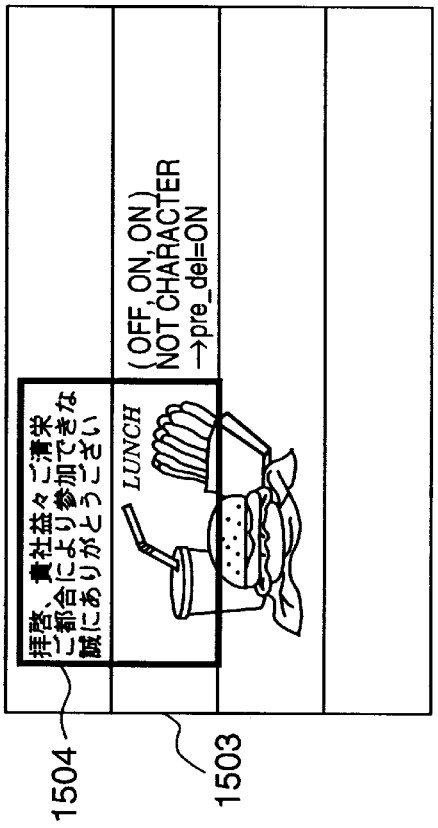
FIGS. 16A to 16D are views for explaining an example of the band processing.

FIG. 16A shows the processing of an uppermost band 1501. In the process of the band processing of the band 1501, a rectangle 1502 has been extracted by edge detection and coupling processing. Since this rectangle starts in that band, its rectangle information (pre_del, series, remain) is (OFF, OFF, OFF). In this band, max_edgenum indicating the edge amount in the rectangle information is very large due to the presence of a character portion, and exceeds the threshold value for character discrimination. Hence, the character discrimination result in the rectangle 1502 in the band 1501 is "character", and rectangle information (pre_del, series, remain) is updated to (OFF, ON, ON).

Figure 16B:
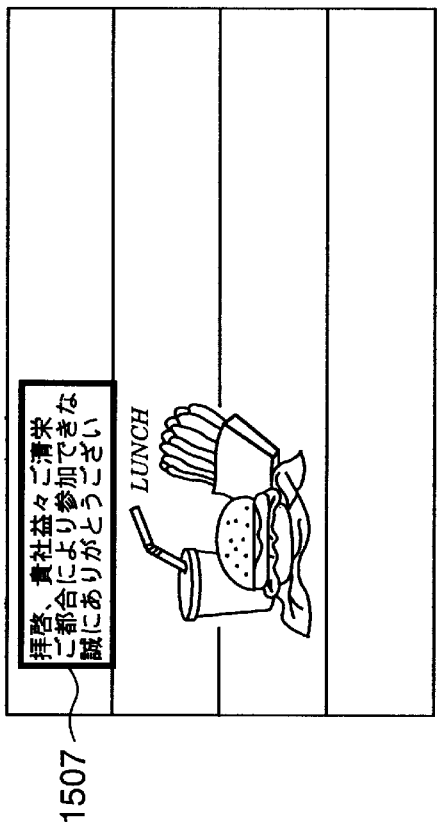

FIG. 16B shows the processing of a second band 1503. In the process of the band processing of the band 1503, a rectangle 1504 has been extracted. Its rectangle information (pre_del, series, remain) is (OFF, ON, ON) in accordance with the band processing result of the band 1501. In this band, max_edgenum indicating the edge amount in the rectangle information is very small due to the presence of an illustration portion, and does not exceed the threshold value for character discrimination. Hence, the character discrimination result of the rectangle 1504 in the band 1503 is "not character". The rectangle information (pre_del, series, remain) is updated to (ON, ON, ON).

Figure 16C:
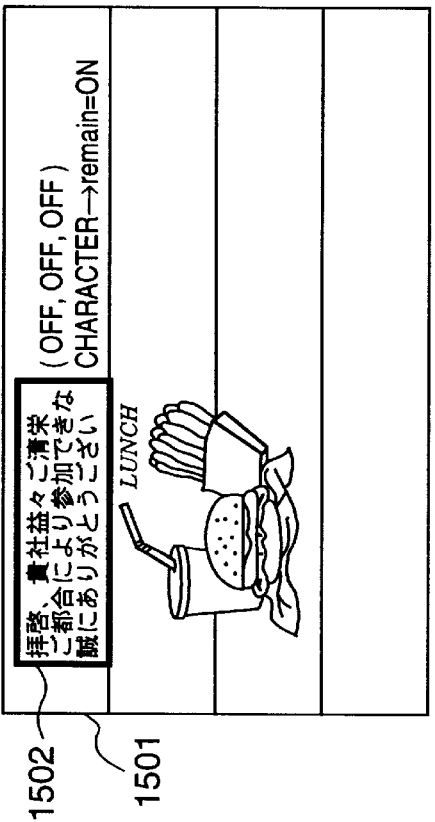

FIG. 16C shows the processing of a third band 1505. In the process of the band processing of the band 1505, a rectangle 1506 has been extracted. Its rectangle information (pre_del, series, remain) is (ON, ON, ON) in accordance with the band processing result of the band 1503. In this band, max_edgenum indicating the edge amount in the rectangle 1506 in the band 1505 is very small due to the presence of an illustration portion, and does not exceed the threshold value for character discrimination. Hence, the character discrimination result of the rectangle 1506 in the band 1505 is "not character". In such band, when the character discrimination result indicates "not character", and pre_del, series, and remain are respectively ON, ON, and ON, processing for moving up endy and closing the rectangle is done. Endy saved in the current rectangle information indicates the final line of the band 1505. However, when "the character discrimination result is "not character", pre_del=ON, series=ON, and remain=ON" in the process of the band processing, endy is moved up to the final line of the band before the immediately preceding band. Then, that rectangle is closed and fixed.

Figure 16D:
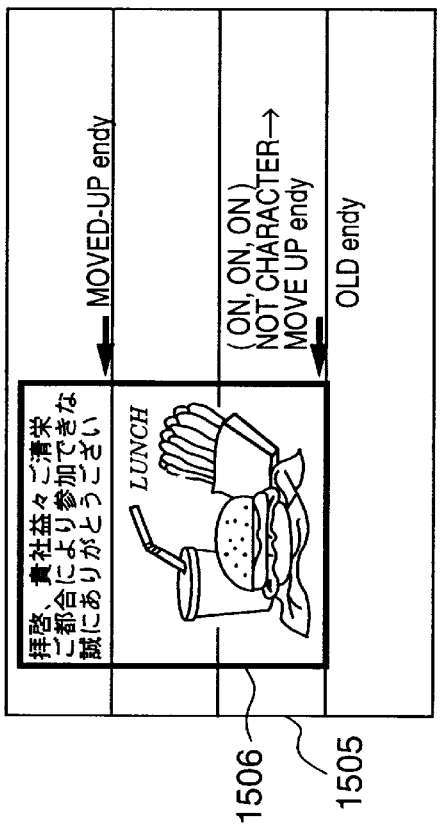

FIG. 16D shows the state of a finally obtained character rectangle 1507. When the rectangle 1506 continues to the next band, a new rectangle is generated by coupling processing in the next band.

A method of generating information mem_no_for_band[] and information region_in_band[] held by the band memory controller 111 will be described below. In mem_no_for_band[], the memory No. of currently processed band m, and the memory No. of band m+1 next to the currently processed band are determined. For example, before processing the first (0th) band, mem_no_for_band[0]=0 and mem_no_for_band[1]=1 are set.

On the other hand, region_in_band[mem_no_for_band[m]] is updated as follows using an initial value=0:

(1) The number of rectangles in currently processed band m is incremented every time a new edge is detected by the edge detection circuit. That is, region_in_band[mem_no_for_band[m]] need only be incremented every time edgenum[count] is incremented in step S316.

(2) The number of rectangles in band m+1 next to the currently processed band is incremented by 1 for each valid rectangle information (rectangle information with valid=ON) in the band processing by the coupling processing circuit (to increment region_in_band[mem_no_for_band[m+1]]).

(3) Upon coupling by the coupling processing circuit, region_in_band[] of a band including a rectangle with small starty is decremented.

FIGS. 17A and 17B are views for explaining changes in the number of rectangles as a result of coupling processing. As can be understood from FIGS. 17A and 17B, the number of rectangles changes by the coupling processing. For example, as the processing progresses from FIG. 15A to FIG. 15D, rectangles cease to exist in the bands 1401 and 1403. In this case, when the number of rectangles region_in_band[] of each of the bands 1401 and 1403 becomes zero, the control is made to overwrite a new next band on these bands. In FIGS. 16A to 16D as well, the number of rectangles region_in_band[] of each of the bands 1503 and 1505 becomes zero, and these bands are overwritten by another band. As a result, bands including no characters are efficiently removed, thus reducing the memory capacity of the binary memory.

Changes in mem_no_for_band[] in FIGS. 17A and 17B will be explained below. Assume that the number "4" of pieces of valid region information is written in region_in_band[mem no_for_band[5]] indicating the number of valid regions in the fifth band from the top upon completion of the processing (coupling processing) of the fourth band from the top in FIG. 14A. Subsequently, when regions 1605, 1606, 1607, and 1608 are generated in the edge detection processing in the fifth band from the top, "1" is added to the value region_in_band[mem_no_for_band[5]] in turn, and finally, "8" is written in region_in_band[mem_no_for_band[5]].

When the coupling processing is done upon completion of the aforementioned edge detection processing, the contents of region_in_band[mem_no_for_band[5]] change as follows:

(i) The region 1609 is generated by coupling the region 1605 to a region 1601. The contents of region_in_band[mem_no_for_band[5]] change from "8" to (ii) The region 1606 is coupled to a region 1602. The contents of region_in_band[mem_no_for_band[5]] change from "7" to "6".

(iii) A region 1610 is generated by coupling the region 1607 to the region generated in (ii). The contents of region_in_band[mem_no_for_band[5]] change from "6" to "5".

(iv) The region 1608 is coupled to a region 1603. The contents of region_in_band[mem_no_for_band[5]] change from "5" to "4".

(v) A region 1611 is generated by coupling the region 1601 to the region 1608 updated in (iv). The contents of region_in_band[mem_no_for_band[5]] change from "4" to "3".

Figure 18:
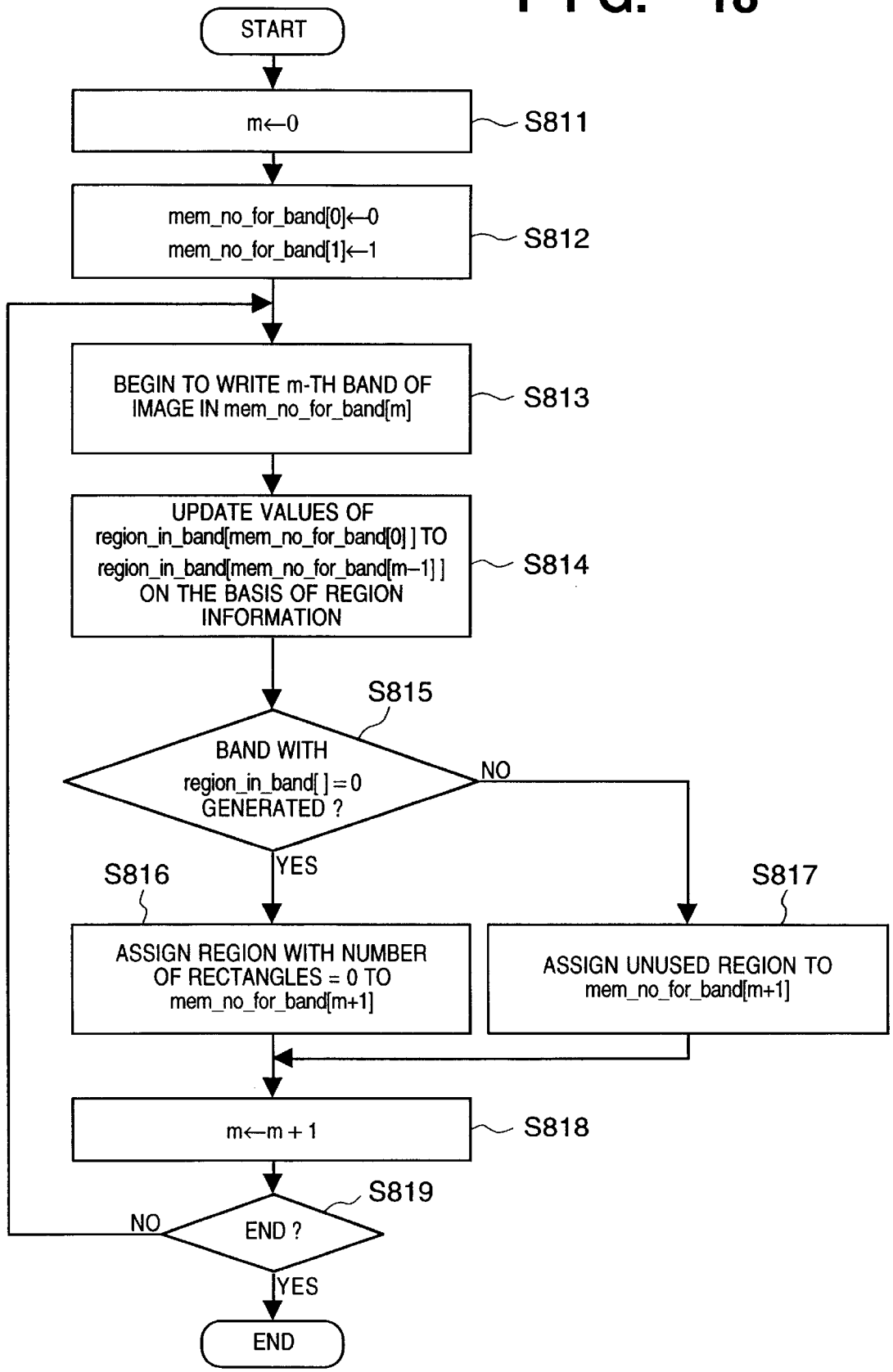
FIG. 18 is a flow chart for explaining the processing sequence of a band memory controller 111.

FIG. 18 is a flow chart for explaining the processing sequence of the band memory controller 111. Referring to FIG. 18, in step S811, zero is substituted in variable m that represents the band number to be processed. In step S812, "0" is substituted in mem_no_for_band[0] and "1" in mem_no_for_band[1]. That is, the first two bands of image data are stored in the 0th and 1st bands in the memory space.

In step S813, the address of the binary memory 107 is controlled to begin to write binary data of the m-th band of the image data in (mem no_for_band[m])-th band. Subsequently, in step S814, the numbers of rectangles of the bands already stored in the binary memory, i.e., the number of rectangles stored in region_in_band[mem_no_for_band[0]] to region_in_band[mem_no_for_band[m−1]] are updated. In this case, the processing results of the aforementioned coupling processing and band processing are reflected.

It is checked in step S815 if region_in_band[mem_no_for_band[0]] to region_in_band[mem_no_for_band[m−1]] include the number of rectangles=0, i.e., if there is a band including no ectangles. If there is a band including no rectangles, and that band is the k-th band on the memory space, k is set in mem_no_for_band[m+2] in step S816. On the other hand, if a band including no rectangles is not found, an unused band number is set in mem_no_for_band[m+2] in step S817.

In step S818, variable m is incremented to start processing of the next band of the image data (the flow returns to step S813 via step S819). If the processing for all the bands in the image data is complete, this processing ends (step S819).

With the above-mentioned processing, character extraction can be satisfactorily attained without requiring any buffer. Upon completion of extraction of a character region for data for one page in this way, character recognition for discriminating the original direction is started. In character recognition, the contents of the binary memory are accessed using the region information stored in the region information memory 104 to acquire a character region image. In this case, the binary memory stores image data in units of bands, and its order is managed by mem_no_for_band[].

Hence, the CPU 108 informs the band memory controller 111 of the required region, and the band memory controller 111 sends back the corresponding region data in the binary memory 107 to the CPU 108.

Since the aforementioned processing of the edge detection circuit 102 is done in units of, e.g., four input lines, and the coupling processing between the contents of the edge coordinate memory 103 and region information memory 104 by the coupling processing circuit 105 is done in,the remaining three lines, real-time processing can be realized without stopping input pixels in units of lines. When processing cannot be completed within the time for three lines, double region information memories may be used to assure a time for four lines. Also, numeral "4" is an example, but may be "5", "6", "8", or "16".

Figure 19:
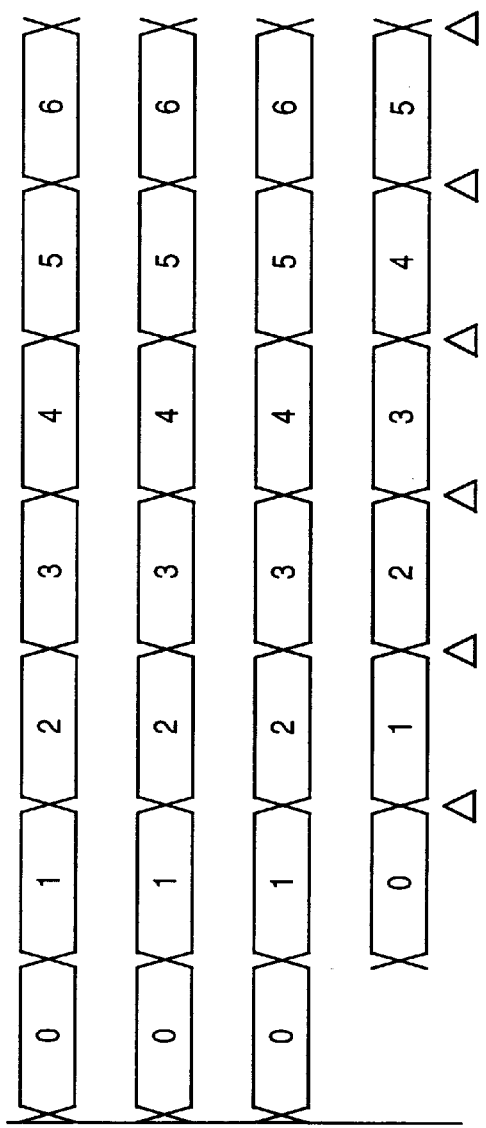
FIG. 19 is a timing chart when character extraction is used in direction recognition.

FIG. 19 is a timing chart when the character extraction described above is used in direction recognition. Referring to FIG. 19, reference numeral 801 denotes an image input from a scanner (CCD); 802, binarization of a multi-valued image input from the scanner. Reference numeral 803 denotes character extraction by the aforementioned character extraction unit 1A. That is, character extraction is executed in real time in synchronism with the input from the scanner. Reference numeral 804 denotes OCR processing, which is done in four directions for a character region extracted by the character extraction 803 to discriminate the direction of a document, vertical or horizontal writing, and the like. The OCR processing 804 discriminates within a predetermined period of time using a timer, and if discrimination fails, it returns zero degree of confidence as UNKNOWN.

FIG. 20 is a timing chart for explaining the timing of conventional character direction discrimination. Although original reading by the CCD and binarization progress in real time, character region extraction and direction discrimination by means of OCR are started after an image for one page has been read.

By contrast, according to the first embodiment, as has been described with reference to FIG. 19, real-time direction recognition can be done without interrupting reading by the CCD. When a timer is not used in the OCR processing, an excessive time may be required. However, as compared to FIG. 20, higher-speed direction discrimination can be attained.

In the example shown in FIG. 19, the binary memory 107 includes two memories. In case of an arrangement which has a single binary memory, the processing can be done at the timing shown in FIG. 21. That is, immediately after a character region is extracted by character extraction 903, OCR processing is started. In such case, the CCD must often be stopped. However, the processing time may be limited using a timer as in FIG. 19, and if direction discrimination fails within the limited time, UNKNOWN may be returned. In such case, the CCD need not be stopped. As shown in an example for the second page, the direction may be discriminated before the beginning of the next page.

In the aforementioned embodiment, a high-frequency region is detected by checking only the horizontal direction of a raster image. However, the present invention is not limited to such specific method, but a high-frequency region may be detected two-dimensionally. In such case, when an edge is discriminated based on the difference between the maximum and minimum pixel values, as shown in the flow chart in FIG. 4, a register for holding maximum and minimum values for the number of horizontal pixels of an image/SAMPLE_PIXEL (horizontal) is required. By two-dimensionally checking, characters such as "—", "—", and the like having no high-frequency components in the horizontal direction, which cannot be detected by the conventional method, can be detected.

When no edge is detected by the edge detection circuit from a certain line, or when the extracted region is deleted by the fix processing and no region remains, the next data is overwritten on the previous line without incrementing the address of the binary memory 107 (without incrementing in units of bands), thus further saving the capacity of the binary memory 107 and, hence, attaining a cost reduction. Note that the fix processing abandons the finally extracted regions with reference to their sizes.

When only the direction is to be discriminated, a character region that allows direction discrimination need only be extracted. Hence, the extraction amount is monitored, and when it has reached a predetermined value, holding of binarization data may be stopped. In such way, the memory capacity can be further reduced.

In the aforementioned embodiment, the difference between the maximum and minimum value is used in edge detection. However, the present invention is not limited to such specific method. For example, a high-frequency portion may be detected by frequency conversion. Furthermore, in the above embodiment, a region in which the number of detected edges is equal to or larger than a predetermined value is detected as a character region. Alternatively, a region in which the number of detected edges is equal to or smaller than a predetermined value may be detected as a picture region.

To restate, according to the above embodiment, since a character region can be extracted in real time from a multi-valued image without waiting for the image binarization result, real-time processing can be realized without stopping the CCD.

Since high-frequency detection is done in units of a predetermined number of lines, a character region can be extracted in real time in units of lines in place of pages without stopping the CCD.

When the cost is to be further reduced, real-time character extraction can be done in turn from pixels from a multi-valued image without requiring any buffer, a region (band) including no characters can be overwritten by the next band by inhibiting the memory address from being incremented (inhibiting the memory address from being incremented in units of bands), thus saving the memory capacity. As a result, a memory for one page need not be prepared, thus attaining a cost reduction.

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, a specific image region can be extracted from an image signal at high speed using a small memory capacity without waiting for completion of storage of the entire image signal in a memory and without storing an unnecessary image region in a memory.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   extraction means for receiving image data in units of lines, and extracting a portion satisfying a predetermined condition from the input line;
   generation means for generating a coupled region by coupling portions, which are extracted by said extraction means and separated by not more than a predetermined distance, to each other for a plurality of lines of the image data;
   discrimination means for discriminating whether or not the coupled region generated by said generation means includes a specific image; and
   holding means for holding region information representing the coupled region which is discriminated by said discrimination means to include the specific image, and holding a band including the coupled region which is discriminated to be a region of the specific image in storage means for storing the image data in units of bands.

2. The apparatus according to claim 1, wherein when the portions which satisfy the predetermined conditions are present adjacent to each other, said extraction means extracts the portions as one portion by coupling the portions.

3. The apparatus according to claim 1, wherein said extraction means discriminates whether or not each of portions obtained by dividing image data for one line by a predetermined width includes an edge, and extracts the portion with the predetermined width, which includes the edge.

4. The apparatus according to claim 3, wherein said extraction means sequentially extracts portions with the predetermined width while partially overlapping the portions with the predetermined widths, so as to extract the portion with the predetermined width, which includes the edge.

5. The apparatus according to claim 1, wherein said discrimination means discriminates in units of bands whether or not the coupled region includes the specific image, and said apparatus further comprises updating means for updating the region information pertaining to the coupled region of interest and held by said holding means on the basis of a discrimination result of said discrimination means.

6. The apparatus according to claim 5, wherein said updating means deletes a portion including no specific image from the coupled region in units of bands on the basis of the discrimination result of said discrimination means.

7. The apparatus according to claim 6, wherein when two, continuous bands in the coupled region do not include the specific image, said updating means deletes the two bands.

8. The apparatus according to claim 5, further comprising deletion means for deleting data of a band including no coupled region, which is generated in said storage means as a result of deletion of the coupled region by said updating means.

9. The apparatus according to claim 1, wherein the specific image is a character image.

10. The apparatus according to claim 1, wherein the specific image is a picture image.

11. The apparatus according to claim 1, further comprising direction discrimination means for discriminating an original direction by performing character recognition on the basis of the region information held by said holding means and the image data stored in units of bands.

12. The apparatus according to claim 11, further comprising print means for printing while rotating the image data input in units of lines on the basis of the original direction discriminated by said direction discrimination means.

13. A region extraction method for extracting a region including a specific image from image data, comprising:
   the extraction step of receiving image data in units of lines, and extracting a portion satisfying a predetermined condition from the input line;
   the generation step of generating a coupled region by coupling portions, which are extracted in the extraction step and separated by not more than a predetermined distance, to each other for a plurality of lines of the image data;
   the discrimination step of discriminating whether or not the coupled region generated in the generation step includes a specific image; and
   the holding step of holding region information representing the coupled region which is discriminated in the discrimination step to include the specific image, and holding a band including the coupled region which is discriminated to be a region of the specific image in storage means for storing the image data in units of bands.

14. The method according to claim 13, wherein when the portions which satisfy the predetermined conditions are present adjacent to each other, the extraction step includes the step of extracting the portions as one portion by coupling the portions.

15. The method according to claim 13, wherein the extraction step includes the step of discriminating whether or not each of portions obtained by dividing image data for one line by a predetermined width includes an edge, and extracting the portion with the predetermined width, which includes the edge.

16. The method according to claim 15, wherein the extraction step includes the step of sequentially extracting portions with the predetermined width while partially overlapping the portions with the predetermined widths, so as to extract the portion with the predetermined width, which includes the edge.

17. The method according to claim 13, wherein the discrimination step includes the step of discriminating in units of bands whether or not the coupled region includes the specific image, and said method further comprises the updating step of updating the region information pertaining to the coupled region of interest and held in the holding step on the basis of a discrimination result in the discrimination step.

18. The method according to claim 17, wherein the updating step includes the step of deleting a portion including no specific image from the coupled region in units of bands on the basis of the discrimination result in the discrimination step.

19. The method according to claim 18, wherein when two, continuous bands in the coupled region do not include the specific image, the updating step includes the step of deleting the two bands.

20. The method according to claim 17, further comprising the deletion step of deleting data of a band including no coupled region, which is generated in said storage means as a result of deletion of the coupled region in the updating step.

21. The method according to claim 13, wherein the specific image is a character image.

22. The method according to claim 13, wherein the specific image is a picture image.

23. The method according to claim 13, further comprising the direction discrimination step of discriminating an original direction by performing character recognition on the basis of the region information held in the holding step and the image data stored in units of bands.

24. The method according to claim 23, further comprising the print step of printing while rotating the image data input in units of lines on the basis of the original direction discriminated in the direction discrimination step.

25. A computer-readable storage medium which stores a control program for extracting a region including a specific image from image data, said control program comprising:

program code that performs an extraction step of receiving image data in units of lines, and extracting a portion satisfying a predetermined condition from the input line;

program code that performs a generation step of generating a coupled region by coupling portions, which are extracted in the extraction step and separated by not more than a predetermined distance, to each other for a plurality of lines of the image data;

program code that performs a discrimination step of discriminating whether or not the coupled region generated in the generation step includes a specific image; and program code that performs a holding step of holding region information representing the coupled region which is discriminated in the discrimination step to include the specific image, and holding a band including the coupled region which is discriminated to be a region of the specific image in storage means for storing the image data in units of bands.

* * * * *

UNITED STATES PATENT AND TRADEMARK OFFICE
CERTIFICATE OF CORRECTION

PATENT NO. : 6,175,662 B1
DATED : January 16, 2001
INVENTOR(S) : Yukari Toda

It is certified that error appears in the above-identified patent and that said Letters Patent is hereby corrected as shown below:

Column 10,
Line 14, "endy" should read -- Endy --.
Line 21, "pre_del" should read -- Pre-del --.

Column 11,
Line 21, "the" (first occurrence) should be deleted.

Column 16,
Line 17, '"8" to' should read -- "8" to "7". --.

Column 18,
Line 6, '"-",' should read -- "= ", --.

Signed and Sealed this

Thirtieth Day of October, 2001

*Attest:*

NICHOLAS P. GODICI
*Attesting Officer*     *Acting Director of the United States Patent and Trademark Office*